US012111115B2

(12) United States Patent
Sherman

(10) Patent No.: US 12,111,115 B2
(45) Date of Patent: Oct. 8, 2024

(54) THERMAL ENERGY STORAGE SYSTEM AND MEDIA

(71) Applicant: Cratus LLC, Euclid, OH (US)

(72) Inventor: Andrew J. Sherman, Mentor, OH (US)

(73) Assignees: Cratus LLC; Andrew J. Sherman

( * ) Notice: Subject to any disclaimer, the term of this patent is extended or adjusted under 35 U.S.C. 154(b) by 0 days.

(21) Appl. No.: 17/740,073

(22) Filed: May 9, 2022

(65) Prior Publication Data

US 2022/0373269 A1    Nov. 24, 2022

Related U.S. Application Data

(60) Provisional application No. 63/185,609, filed on May 7, 2021.

(51) Int. Cl.
*F28D 20/02* (2006.01)
*F28D 20/00* (2006.01)

(52) U.S. Cl.
CPC ....... *F28D 20/025* (2013.01); *F28D 20/0043* (2013.01); *F28D 2020/0047* (2013.01)

(58) Field of Classification Search
CPC . Y02E 60/14; C09K 5/06; C09K 5/063; F24S 80/20; F28D 20/02
See application file for complete search history.

(56) References Cited

U.S. PATENT DOCUMENTS

2008/0256952 A1* 10/2008 Litwin .................... F24S 90/00
423/579
2017/0141724 A1* 5/2017 O'Donnell ............. F24T 10/15

FOREIGN PATENT DOCUMENTS

CN    112574717 A  *  3/2021  ............. B01J 13/06

* cited by examiner

*Primary Examiner* — Eric S Ruppert
(74) *Attorney, Agent, or Firm* — UB Greensfelder LLP; Brian Erkin Turung

(57) ABSTRACT

The present disclosure is directed to materials that can be used in a heat storage and transfer, and an improved method for storing thermal energy which includes a high heat capacity thermal energy storage system using pumped or flowing metallic phase change materials (MPCs). Heat is added by pumping a cold fluid of MPCs mixed with a fluid media such as a molten glass and/or salt from a tank through a heat exchanger, solar receiver, or electrical heater cell and returning the heated fluid to a tank, or solid MPCs can be transported physically, or via gas transport such as entrained flow or a circulating fluid bed. In the heat exchanger, heat can optionally be transferred directly to a counterflowing gas or other fluid, or indirectly through heat exchanger walls to a working fluid, which can be steam, $CO_2$ or $sCO_2$, He, $H_2$, process gas, and/or heat transfer fluid. The MPCs (encapsulated MPCs, non-coated MPCs) are solid-liquid and/or solid-solid phase change particles, salts, metals, or other compounds with a melting point between the hot and cold fluid temperatures, and can optionally include high heat capacity, and/or energy absorbing (IR and divisible) nanoparticles.

38 Claims, 2 Drawing Sheets

THERMAL ENERGY STORAGE SYSTEM AND MEDIA

The disclosure claims priority on U.S. Provisional Application Ser. No. 63/185,609 filed May 7, 2021, which is incorporated herein by reference.

TECHNICAL FIELD

The present disclosure relates to materials that can be used in a thermal energy storage system suitable for use in a solar or nuclear power system, for example, or used to store energy for later use or conversion to electricity. In particular, the present disclosure is directed to an improved material and method for storing thermal energy, particularly to the field of heat storage and transfer, and more particularly to molten salt heat-transfer and heat-storage medium, and preparation method and use thereof. More particular, the disclosure is directed to an improved method for storing thermal energy which includes a high heat capacity thermal energy storage system using pumped or flowing metallic phase change materials (MPCs). Heat is added by pumping a cold fluid of MPCs mixed with a fluid media such as a molten glass and/or salt from a tank through a heat exchanger, solar receiver, or electrical heater cell and returning the heated fluid to a tank. Alternatively, the solid MPC can be transported physically, or via gas transport such as entrained flow or a circulating fluid bed. To draw heat, MPC is moved from the tank to the heat exchanger or other heat load, and returned to a tank. In the heat exchanger, heat can optionally be transferred directly to a counterflowing gas or other fluid, or indirectly through heat exchanger walls to a working fluid, which can be steam, $CO_2$ or $sCO_2$, He, $H_2$, process gas, and/or heat transfer fluid. The thermal fluid includes a) a salt and/or glass, b) MPCs, and c) optionally nanoparticles. The thermal fluid can includes a molten salt and/or other fluid such as, but not limited to, molten glass and MPCs (encapsulated MPCs, non-coated MPCs), which MPCs are solid-liquid and/or solid-solid phase change particles, salts, metals, or other compounds with a melting point between the hot and cold fluid temperatures, and can optionally include high heat capacity, and/or energy absorbing (IR and divisible) nanoparticles to optionally enhance the energy storage, optionally reduce the size of the tank, and/or optionally allow for direct heating of the salt, MPC particles, and/or glass. MPCs can optionally be heated by a gas while static, such as for air, or helium, or $sCO_2$ Brayton or Stirling generator systems, or circulated through heat exchangers, such as a falling particle solar receiver for charging and discharging heat. The tank can be optionally insulated with a cold wall to minimize thermal ratcheting during use, and can optionally be further lined with an impermeable layer with controlled coefficient of thermal expansion (CTE) and stiffness. The MPC materials in accordance with the present disclosure can be used in various industries such as, but not limited to, solar energy collection systems, power generation, and high temperature heat transfer and storage systems paired with concentrating solar or other renewable energy source (e.g., include cement production/calcination, petrochemical production, fuels, hydrogen production, methane reforming, glass production waste heat recovery, direct reduction of iron ore, thermochemical hydrogen production, steam reforming and ammonia production with renewable energy, and steel production, for example).

BACKGROUND OF DISCLOSURE

Renewable energy, such as photovoltaics, concentrating solar, and wind generation, as well as modular nuclear offer solutions to decarbonizing the energy supply. These technologies provide intermittent, or fixed baseload (nuclear) power, and must be augmented with energy storage to meet 24-hour operational needs and improve economics. Adding 8-16-hour energy storage can make solar (and nuclear and wind) much more economical.

With regard to solar energy, the ability to capture (solar or other energy source), store, and deliver heat at elevated temperatures provides huge potential for decarbonization and fossil fuel use reduction. High-temperature energy capture and storage provides the potential for significant conservation of fossil fuel and reduction in $CO_2$ emissions, particularly for concentrating solar power or intermittent renewable energy sources. The requirement for industrial process heat between 650-1100° C. in the United States alone is approximately 2.8 quads (2.8 EJ) per year. Storage at high temperatures would allow a significant part of that heat to be provided by solar or renewable energy.

High temperature energy storage above 800° C. is enabling for thermochemical fuels production, including thermochemical production of hydrogen, as well as industrial processing and heat recovery from metal production, cement production, steel production, and combined heat and electrical generation. High temperature capture and storage allows for a significant increase in conversion efficiency for steam-based power cycles, as well as cogeneration of electricity and process heat. Cogeneration of heat and electricity by solar energy becomes attractive at high temperatures (above 900° C.). Cogeneration represents a large potential market. The amount of electricity purchased by industry in the United States is about 4.2 quads (4.2 quadrillion British thermal units (BTUs)). In addition, the industry used about 24 quads of heat for processes, about 50% of which is used at 650° C. or lower temperatures. A part of this electricity and heat could be provided by cogeneration using solar or other renewable intermittent energy, or via waste heat recovery. By using high temperature (above 900° C.) solar central receiver systems and energy storage, Brayton-cycle engines could be run and their exhaust used for process heat. The high temperature solar energy collection system would only have to be 65% or less than the size of a lower-temperature (540° C.) solar energy collection system while providing the same amount of electricity as well as high value process heat.

FIG. 1 illustrates the improvement in thermal-electric conversion with increasing temperature. Currently, power generation systems operate between 200-600° C. and have a maximum efficiency of about 20-30%. As illustrated in FIG. 1, if the power generation systems were able to operate at higher temperatures of 800° C. or greater, efficiencies of about 40-50% can be achieved. Furthermore, operating at temperatures of at least 1100° C. also allows for utilization of the exhaust heat for process heating, thus total efficiencies of up to 70% can be obtained.

Currently, the cost of concentrating solar power (CSP) is the highest of all renewables; and cost reduction is a high priority to make CSP attractive. The use of higher efficiency power cycles is essential for cost reduction, as well as increasing the power density (reducing the size) of the energy capture and storage system, as well as reducing heliostat and control costs. In addition to increasing temperature to allow use in industrial processes (and to capture high quality waste heat from combustion processes), dramatic reductions in capital costs are required for energy capture and storage systems to be commercially competitive with coke and natural gas. Department of Energy goals for thermal energy storage were a 50% reduction in storage cost, with an ultimate goal of 70-90% reduction. These goals can only be achieved by dramatic increases in system performance and reduction of system size.

Key industries, in addition to power generation, that can be decarbonized using high temperature heat transfer and storage systems paired with concentrating solar or other renewable energy source (e.g., cement product, petrochemical production, fuels, hydrogen production, methane reforming, glass production waste heat recovery, direct reduction of iron ore, thermochemical hydrogen production operating and steam reforming and ammonia production with renewable energy, and steel production, all require high temperature and thermal energy capture, storage, and delivery systems). These industries represent the majority of $CO_2$ emissions worldwide, and most are difficult to decarbonize cost effectively with heat transfer and storage media below 800° C. Heavy industry represents approximately 40% of all global $CO_2$ emissions. Steel, cement, and chemicals (methane reforming) represent the majority of those emissions, and are the most difficult to decarbonize due to the high temperatures required (above 800° C.).

About 60% of all fossil fuel energy and $CO_2$ emissions come from high temperature processes above 600° C., including power generation, steel and concrete production, aluminum refining, and others. A majority of this energy is used in the form of heat. Steel production represents approximately 7% of total $CO_2$ releases worldwide due to its intensive use of fuel and carbon/coke.

In molten salt thermal energy storage systems, two large storage tanks are typically used for molten salt thermal storage. These tanks typically hold from 20,000 lbs. to well over 50 million lbs. of salt. Each tank can be from 10 ft.×10 ft. to over 125 ft. (38 m) in diameter and over 40 ft. (12 m) tall. In a power tower system, the cold tank is typically fabricated out of a carbon or stainless steel material and stores salt at about 550-1000° F. (288-560° C.). The hot tank can typically be fabricated out of a stainless steel, nickel-based alloy, or other high strength alloy and stores salt at about 1050-1400° F. (566-760° C.).

Each tank is sized to store the entire working inventory of molten salt or glass. In concentrating solar power applications, during the day, cold salt is pumped out of the cold tank, through the solar energy receiver wherein the salt is heated, and then stored in the hot tank. When required to produce steam or heat $CO_2$ to produce electrical power, the hot salt is pumped out of the hot tank and sent to the heat exchanger system, where it is cooled and returned to the cold thermal storage tank. In this fashion, salt is "shuttled" back and forth between the two tanks following a diurnal cycle. Due to the use of two tanks, there is twice the storage capacity in the combined volume of the two tanks as there is molten salt. At times, one tank is generally full and the other tank is generally empty, and other times both tanks are partially full.

Salt tanks for large solar plants or nuclear power plants are quite expensive and include electrical heat tracing or other forms of heaters, thermal insulation, cooled foundation, instrumentation, and other supplementary equipment including the needed support structure. To date, designers have studied replacing the hot and cold tanks with a single tank, but have not solved the problem of effectively and efficiently precluding the mixing of the hot and cold fluids in a single tank. Furthermore, the size of the tanks and secondary systems (heat exchanger, pumping, control system) are directly related to the fluid volume and fluid properties. A higher heat capacity material, with a high difference in hot and cold temperatures, can be used to minimize the size and cost of the tank.

Several materials have been investigated as potential thermal energy storage and transfer media. Among these materials, molten salts have been widely used as thermal energy storage and heat transfer fluid in solar power generation systems due to their wide working temperature, lower vapor pressure, moderate heat capacity, and good thermal stability. Salts composed of sodium nitrate and potassium nitrate (60 wt. % sodium nitrate-40 wt. % potassium nitrate, MP 221° C.) is a popular salt mixture and has been used successfully as a thermal energy storage medium in the solar two central receiver projects and a commercial plant of Gemasolar in Spain. HITEC, which is a ternary salt mixture of $NaNO_3$, $KNO_3$ and $NaNO_2$ (7 wt. %-53 wt. %-40% wt. %, MP 142° C.) has a wider operating temperature of up to 454° C., and may be used up to 538° C. for short periods. The Rankine cycle efficiency should rise with the increasing maximum output temperature of the fluid. Unfortunately, these nitrate salts are not stable enough at high temperatures, thus restricting their application in temperatures over 500° C.

The operating temperature of a power turbine in current CSP operations is limited to 565° C. by the molten nitrate heat transfer fluid; therefore, a new molten salt chemistry is needed to increase the maximum operating temperature in the new generation of CSP plants and improve the thermal energy conversion efficiency in the turbine block, such as chloride molten salts.

Alternate carbonates and fluoride salts needed to include lithium in their formulations in order to reduce their melting points to levels below 500° C., thus increasing the final cost for the thermal energy storage material. On the other hand, chloride molten salts are considered a feasible option due to their low cost and high decomposition temperature.

One of the most studied chlorine salt mixtures is composed of $MgC_{12}$/NaCl/KCl (55.1 wt. % $MgC_{12}$-24.5 wt. % NaCl-20.4 wt. % KCl). This salt has a melting point of 380° C., thermal stability up to 800° C., and higher heat capacity (compared to chloride salts containing $ZnCl_2$), and also low vapor pressure. This last parameter is one of the main drawbacks of using $ZnC_{12}$ due to their important increase at 530° C.

Molten chloride salts have long been applied by industry for heat transfer, heat treatment, high temperature electrochemical coatings, and other processes. Chlorides are attractive due to their low-cost, abundant, high-latent heat, appropriate operating temperature (400-850° C.), and good thermal stability. Three ternary chloride molten salt systems have been developed ($AlCl_3$—NaCl—KCl, $ZnCl_2$—NaCl—KCl and $FeCl_3$—NaCl—KCl). However, the low boiling point and high vapor pressure of $AlCl_3$ and $FeCl_3$ restricts the application for such salts. A binary chloride molten salt system consisting of NaCl and $CaCl_2$ has been developed. The NaCl—$CaCl_2$)—$MgCl_2$ ternary system with a lower melting point 424° C. was also designed.

In order to further reduce the melting point, increase the heat capacity, and broaden the operating temperature, a quaternary chloride system of KCl—NaCl—$CaCl_2$—$MgCl_2$ was developed. The heat capacity data of the quaternary eutectic salt mixture shows a steady increase with temperature both in solid and liquid states. The heat capacity data for solid quaternary salt mixture is very close to the sum of pure salts' heat capacity from the literature. The heat capacity of liquid quaternary salt mixture in a liquid state is larger than that of the solid state because of disorder of the ions in this liquid state. The additional energy stored inside the liquid state salt contributes to the increased part of heat capacity compared to solid state salt. The average heat capacity of this quaternary salt mixture was greater than the NaCl—CaCl$_2$—MgCl$_2$ ternary salt (average solid heat capacity 0.83 J/g/C, liquid 1.19 J/g/C) by over 20%, averaging around 1.3-1.4 J/g/C from 500-700° C.

Thermal energy storage systems incorporating MPCs are also known in the art. Such systems generally include a tank containing the MPCs. Thermal energy, when added to the MPC, causes the MPCs to absorb at least some thermal energy in an amount equal to its heat of fusion and accordingly change phase from solid to liquid. Thermal energy, when removed from the MPCs, causes the MPCs to release its heat of fusion and accordingly change phase from liquid to solid.

Prior art references include U.S. Pat. Nos. 1,805,165; 2,218,063; 4,405,010; 4,523,629; 4,590,992; 4,598,694; 4,643,212; 4,987,922; 6,877,508; 7,051,529; 7,055,519; 7,296,410; 7,299,633; 7,458,418; 9,657,966; 9,650,556; 10,107,564; and 10,351,748.

In view of the current state of the art, there is a need for improved materials and methods for storing thermal energy.

SUMMARY OF THE DISCLOSURE

The present disclosure is directed to an improved material and method for storing thermal energy, particularly to the field of heat storage and transfer, and more particularly to molten salt heat-transfer and heat-storage medium, and preparation method and use thereof. In particular, the disclosure is directed to an improved method for storing thermal energy which includes a high heat capacity thermal energy storage system using pumped or flowing metallic phase change materials (MPCs) in accordance with the present disclosure. Heat can be added by pumping a cold fluid of MPCs mixed with a fluid media such as a molten glass and/or salt from tank through a heat exchanger, solar receiver, or electrical heater cell and returning the heated fluid to a tank. To draw heat, fluid can be pumped from a tank to the heat exchanger or other heat load, and returned to a tank. The thermal fluid includes molten salt and/or other fluid such as molten glass and MPCs (encapsulated MPCs, non-coated MPCs) that are solid-liquid and/or solid-solid phase change particles, salts, metals, or other compounds with a melting point between the hot and cold fluid temperatures, and can optionally include high heat capacity, and/or energy absorbing (IR and divisible) nanoparticles to optionally enhance the energy storage, optionally reduce the size of the tank, and/or optionally allow for direct heating of the salt and/or glass. MPCs can optionally be heated directly while flowing over a heating element or through a particle heat exchanger or article solar receiver, or by a gas while static, such as for air, or helium, or sCO$_2$ Brayton or Stirling generator systems, or circulated through heat exchangers, such as a falling particle solar receiver for charging and discharging heat. The tank can be optionally insulated with a cold wall to minimize thermal ratcheting during use, and can optionally be further lined with an impermeable layer with controlled CTE and stiffness. The MPCs in accordance with the present disclosure can be used in various industries such as solar energy collection systems, power generation, and high temperature heat transfer and storage systems paired with concentrating solar or other renewable energy source (e.g., cement production, petrochemical production, fuels, hydrogen production, methane reforming, glass production waste heat recovery, direct reduction of iron ore, thermochemical hydrogen production operating and steam reforming and ammonia production with renewable energy, and steel production).

In another non-limiting aspect of the present disclosure, there is provided high temperature MPCs with high energy density that can be used in temperature environments of at least 400° C. (e.g., 400-2000° C. and all values and ranges therebetween). As defined herein, a MPC that can be reused in a certain temperature environment is an MPC that retains its composition during the heating and cooling cycle as the MPC is circulated with the other components of the thermal fluid in the thermal energy storage system. As such, a MPC is defined as being reusable as the MPC is circulated with the other components of the thermal fluid in the thermal energy storage system if a) when the MPC is an uncoated material, the metallic components of the MPC remain intact and do not melt or otherwise dissolve in the thermal fluid as the MPC is heated and cooled while the MPC is circulated with the other components of the thermal fluid in the thermal energy storage system, or b) when the MPC is coated, the metallic components that form the core of the MPC may not melt, may partially melt or may fully melt within the coating as the MPC is heated and cooled while the MPC is circulated with the other components of the thermal fluid in the thermal energy storage system, and the coating remains intact and does not melt or dissolve in the thermal fluid as the MPC is heated and cooled as the MPC is circulated with the other components of the thermal fluid in the thermal energy storage system, thus maintaining the integrity of the MPC during heating and cooling. In one non-limiting embodiment, there are provided high temperature MPCs with high energy density that can be used in temperature environments of at least 400° C. (e.g., 400-1800° C. and all values and ranges therebetween). In another non-limiting embodiment, there are provided high temperature MPCs with high energy density that can be used in temperature environments of 850-1800° C. In another non-limiting embodiment, there are provided high temperature MPCs with high energy density that can be used in temperature environments of 900-1500° C. In another non-limiting embodiment, there are provided high temperature MPCs with high energy density that can be used in temperature environments of 800-1200° C. In another non-limiting embodiment, there are provided high temperature MPCs with high energy density that can be used in temperature environments of 1000-1200° C. In another non-limiting embodiment, there are provided high temperature MPCs with high energy density that can be used in temperature environments of 900-1150° C.

In another non-limiting aspect of the present disclosure, the MPCs can optionally be used in high power density operations, enhanced molten glass thermal energy transport, and/or storage media operations at temperatures of at least 400° C. In one non-limiting embodiment, the MPCs can be used in high power density operations, enhanced molten glass thermal energy transport, and/or storage media operations at temperatures of at least 800° C. In another non-limiting embodiment, the capture, transfer, and storage of solar thermal energy at temperatures of about 1100-1200° C. can include the use of MPCs in low viscosity enhanced molten glass to thereby reduce the size and costs of the thermal energy storage systems as compared to traditional molten salts, particle, gas, or molten glass systems, due in part to the high latent heat of the MPCs. Furthermore, the temperature of the heat release of the MPCs can be tailored by tailoring the phase change alloy and melting range of the MPCs, and/or to mixing and matching different types of MPCs to form a desired MPC mixture having a range of liquidus-solidus temperatures, thereby enabling improved thermal efficiency of an industrial or energy generation process.

The higher storage temperatures of the MPCs enable much higher thermal-electrical efficiencies (up to 80% combined heat and power, >50% in direct power cycles), and can operate in temperature regimes suitable for decarbonizing industrial processes, including steel, ammonia, hydrogen production, glass, and concrete manufacture. The use of MPCs based on silicon (Si) in composition with aluminum, boron, germanium, and/or magnesium can provide for 100 X-150 X the energy density of lithium-ion batteries, scaling potentially to 50-100 MW-hrs of energy storage in the size of a 40 ft. container. As can be appreciated, other size container can be used. This thermal energy storage that includes the use of MPCs can optionally be generated using grid-power or nuclear-generated power (100% conversion to heat), concentrating solar, or renewable and intermittent (PV, wind) sources. Such thermal energy storage can optionally be a) paired with a turbogenerator (supercritical steam or $CO_2$) to generate power, or b) coupled with thermochemical reactors to produce chemicals such as hydrogen and ammonia, and/or energy-intense commodities such as steel and concrete.

In another non-limiting aspect of the present disclosure, MPCs can optionally be used to provide high storage density (e.g., at least 10-50 MW-hr in 40 ft. container space), can result in lower costs for thermal energy storage systems, and/or can be scalable for use in thermal (and electrical) energy storage. The small size of MPCs facilitates in resolving reliability issues of larger (e.g., molten salt, molten glass, etc.) systems by limiting thermomechanical forces by reducing dimensions (and also cost) of piping and storage tanks. By tailoring the melting point range of MPCs using hypereutectics (e.g., alloys based on Si in combination with aluminum, boron, germanium, and/or magnesium), the absorption and delivery of energy of MPCs can be matched to a particular application in which MPCs are used (e.g., solar irradiance, residence time, thermal load reactor (counterflow). Use of MPCs can allow mid tower level storage for realistic size energy storage schemes, thereby solving scaling problems with current sand-based systems while achieving higher performance.

FIG. 2 illustrates a non-limiting Concentrating Solar Power (CSP) plant that uses mirrors to concentrate the sun's energy to drive traditional steam turbines or engines that create electricity, and wherein the thermal storage system includes the use of MPCs in accordance with the present disclosure. For steel production, heat can be pulled directly, in addition to being used for electrical generation (which in turn can be used to produce hydrogen and power the electric arc furnace for final steel production).

Because solar power is variable, methods of energy storage are required to shift power production to match demand and power prices, and to allow up to 24-hour operation of industrial processes. The CSP plant is illustrated as including hot and cold molten salt storage tanks, heat exchangers, a power tower, and a power block. Currently, the cost and availability of MW-GW scale energy storage and higher temperature storage are major limitations holding back greater adoption of renewable power generation and industrial use of solar thermal energy. Currently, state of the art molten salt storage and CSP power tower operation is limited to a maximum of around 565° C. (mixed nitrate salts). Rankine cycle power turbines operating at these conditions have a thermal efficiency around 41%.

Operating a supercritical $CO_2$ ($sCO_2$) recuperated recompression Brayton cycle at 700° C. offers 55% efficiency in thermal energy use, as well as being compatible with the $CO_2$-free production of iron by hydrogen reduction of iron ore, and potentially a significant number of calcination and drying operations and other industrial operations operating at or around 600° C. (about ¼th-⅓rd of all industrial heat is used at 600° C.). Transitioning to higher temperature power cycles can a) dramatically improve plant efficiencies, b) reduce the size of the solar field, c) reduce salt storage tank size, d) reduce pumping requirements, and/or e) reduce operating costs.

As such, by increasing operating temperatures to 600-800° C. or greater (e.g., 900-1150° C.) can result in a reduction of required tank size, pump size, and heat exchanger size by over 30%, and an improvement in thermal efficiency by at least 15% (e.g., 24%, 50%, etc.) for combined heat and power, while operating in the range suitable for steam reforming and thermochemical fuel (hydrogen) production. Also, when using MPCs in combination with a salt and/or glass system, a single tank system can optionally be used to further reduce the system size (and cost) by 50% or more (e.g., 80% or more). The thermal energy can be used directly for industrial processing with over 50% efficiency (e.g., 50-90+% efficiency), thereby allowing for the optional replacement of the power block with a reactor system. The CSP plant can be used for thermochemical production of hydrogen and steam reforming for ammonia and petrochemical production, along with power generation; however, is will be appreciated that the CSP plant can be used for other applications.

In another non-limiting aspect of the present disclosure, MPCs can be combined with molten glass (e.g., a quaternary molten glass, etc.) to reduce the size and/or cost of thermal energy storage (and transport) systems as compared to current solar salt systems or solar glass systems. In another non-limiting embodiment, the MPCs are inert to molten glass, and/or mechanically durable in terms of thermal fatigue and mechanical impact. Non-limiting glass that is used with the MPCs includes glass based on multicomponent borate and/or phosphate glass systems. Such glass systems can optionally also contain 1-15% $SiO_2$. In one non-limiting embodiment, the glass can have a viscosity of 80-120 pa-s at 700-800° C., and a glass transition temperature (Tg) of 400-450° C.; however, it will be appreciated that other glasses can be used.

In another non-limiting aspect of the present disclosure, when the MPCs are combined with a glass and/or salt for use in a thermal energy storage (and transport) systems or the like, the content of the MPCs in the mixture of MPCs and glass and/or salt is at least 5 vol. %. In another non-limiting embodiment, when the MPCs are combined with a glass and/or salt, the content of the MPCs in the mixture of MPCs and glass and/or salt is 5-80 vol. % (and all values and ranges therebetween). In another non-limiting embodiment, when the MPCs are combined with a glass and/or salt, the content of the MPCs in the mixture of MPCs and glass and/or salt is 20-60 vol. %. In another non-limiting embodiment, when the MPCs are combined with a glass and/or salt, the content of the MPCs in the mixture of MPCs and glass and/or salt is 20-40 vol. %.

In another and/or alternative non-limiting aspect of the disclosure, in addition to the addition of MPCs to the salt and/or glass, colloidal nanoparticles can optionally be added to the salt and/or glass to significantly enhance heat capacity, absorptivity and/or thermal conductivity. Heat transfer and thermal storage can be improved with the addition of 0.5-10 vol. % colloidal nanoparticles (and all values and ranges therebetween) to the salt system, and typically 1-6 vol. % colloidal nanoparticles to the salt system, and more typically 2-5 vol. % colloidal nanoparticles to the salt system. The colloidal nanoparticles (when used) can be added by dispersing metal or metal oxide nanoparticles and/or non-metal oxide nanoparticles into molten salt system. Non-limiting examples of colloidal nanoparticles include $SiO_2$, ZnO, $Al_2O_3$, $TiO_2$, MgO, $Fe_2O_3$, $BaTiO_3$, $Ce_2O_3$, $ZrO_2$, and/or CaO nanoparticles, and/or metal nanoparticles (e.g., Ni, Mo, Ag, and/or other salt-stable metal nanoparticles). The average particle diameter of the colloidal nanoparticles is 10-200 nm (and all values and ranges therebetween), and typically 10-50 nm. The addition of colloidal nanoparticles can a) increase the sensible heat by 5% or more per unit volume, b) enhance the retention of the MPCs in the salt system, and/or c) enhance the molten salt thermal conductivity of the salt system by at least 5%, typically by more than 10%, and more typically by more than 20%. Since molten salts are relatively transparent to infrared, the colloidal nanoparticles are able to absorb visible and IR wavelengths, thus dramatically enhance thermal absorption/conductivity in the 650° C.-1000° C. range. The addition of colloidal nanoparticles and/or MPCs to the salt system allows for direct heating of the molten salt by light, thereby simplifying the receiver design.

In another non-limiting aspect of the present disclosure, the MPCs include Si-(A and/or B) MPC; Si-(A and/or B)-(X) MPC; and/or Si-(A and/or B)-(X and Y). The elements for A and B are selected from aluminum (Al), copper (Cu), boron (B), germanium (Ge), and magnesium (Mg). When A and B are used in the MPCs, A and B are different elements. The elements for X and Y are selected from Al, Ca, Cr, Co, Cu, Fe, Mg, Mn, and Ni. When X and/or Y are used, X and/or Y are different from A and/or B. When X and Y are used in the MPCs, X and Y are different elements. Non-limiting MPCs include Si—Al, Si—Mg—Cu, Si—Mg, S—Al—Ca, Si—Cu—Ca, Si—Ge, Si—B, Si—Ge—B, Si—Ge—B—X, and/or Si—Ge—B-X-Y. In one non-limiting embodiment, the MPCs include Si—Ge—(X and/or Y) wherein X and/or Y are Cr, Cu, Fe, Mn, or Ni. In another non-limiting embodiment, the MPCs include Si—Ge—(X and/or Y) wherein X and/or Y are Al, Co, Fe, Mg or Ni. In another non-limiting embodiment, the MPCs include Si—Ge—B—X wherein X is Al, Co, Fe, Mg or Ni. In another non-limiting embodiment, the MPCs include Si—Ge—(X and/or Y) wherein X and/or Y is Cr, Fe or Mn. In another non-limiting embodiment, the MPCs include Si—Ge—Fe, Si—Ge—Mn, Si—Ge—Fe—Mn, Si—Ge—Cu, Si—Ge—Ni, Si—Ge—Cr, Si—Ge—Cu—Fe, Si—Ge—Ni—Fe, and/or Si—Ge—Cr—Fe. In another non-limiting embodiment, the total weight percent of the MPCs formed of Si-(A and/or B) is 90-100% (and all values and ranges therebetween). In another non-limiting embodiment, the total weight percent of the MPCs formed of Si-(A and/or B)-(X) is 90-100% (and all values and ranges therebetween). In another non-limiting embodiment, the total weight percent of the MPCs formed of Si-(A and/or B)-(X and Y) is 90-100% (and all values and ranges therebetween). In one non-limiting formulation, the MPCs have a Si content of at least 10 wt. % (e.g., 10-90 wt. % and all values and ranges therebetween). In another non-limiting aspect of the present disclosure, when the MPCs include Ge, the Ge content in the MPCs is at least 10 wt. % (e.g., 10-60 wt. % and all values and ranges therebetween). In another non-limiting aspect of the present disclosure, when the MPCs include B, the B content in the MPCs is at least 10 wt. % (e.g., 10-60 wt. % and all values and ranges therebetween). In another non-limiting aspect of the present disclosure, when the MPCs include Al, the Al content in the MPCs is at least 10 wt. % (e.g., 10-60 wt. % and all values and ranges therebetween). In another non-limiting aspect of the present disclosure, when the MPCs include Cu, the Cu content in the MPCs is at least 10 wt. % (e.g., 10-60 wt. % and all values and ranges therebetween). In another non-limiting aspect of the present disclosure, when the MPCs include Mg, the Mg content in the MPCs is at least 10 wt. % (e.g., 10-60 wt. % and all values and ranges therebetween). In another non-limiting aspect of the present disclosure, when the MPCs include only X (e.g., Al, Ca, Cr, Co, Cu, Fe, Mg, Mn, Ni), the X content in the MPCs is at least 1 wt. % (e.g., 1-40 wt. % and all values and ranges therebetween). In another non-limiting aspect of the present disclosure, when the MPCs include both X (e.g., Al, Ca, Cr, Co, Cu, Fe, Mg, Mn, Ni) and Y (e.g., Al, Ca, Cr, Co, Cu, Fe, Mg, Mn, Ni), the X content in the MPCs is at least 1 wt. % (e.g., 1-30 wt. % and all values and ranges therebetween) and the Y content in the MPCs is at least 1 wt. % (e.g., 1-30 wt. % and all values and ranges therebetween). In one non-limiting formulation, the MPC is a Si—Al hypoeutectic alloy that can be used to delivered at 590° C.-720° C. at up to 260% of the power density (per unit mass) of prior art molten salts alone. The Si content of the alloy is 12.6-22 wt. % and all values and ranges therebetween. In another non-limiting formulation, the MPC is a Si—Mg—Cu or Si—Al—Ca, wherein the Si content is about 45-55 wt. % and all values and ranges therebetween. In another non-limiting formulation, the MPC is a Si—Mg—Al—Ca system. The addition of Si to the system allows a significant increase in latent heat. Calcium can be added to reduce density, while magnesium and aluminum can be alloyed to match salt density (with added porosity) and to provide high latent heat, controlled MP range, and high thermal conductivity. In one non-limiting embodiment, the Si—Mg—Al—Ca system includes 35-50 wt. % Al (and all values and ranges therebetween), 15-30 wt. % Si (and all values and ranges therebetween), 20-50 wt. % Mg (and all values and ranges therebetween), and 0.1-25 wt. % Ca (and all values and ranges therebetween). Generally, the metal alloy composition of the MPC particles is a eutectic composition; however, this is not required.

In another non-limiting aspect of the present disclosure, the MPCs can be optionally formed of mixtures that are at or near (e.g., all elements are within 0-10 wt. % of the eutectic mixture and all values and ranges therebetween) a binary eutectic mixture, a ternary eutectic mixture, a quaternary eutectic mixture, or pentanary eutectic mixture.

In another non-limiting aspect of the present disclosure, the MPCs can optionally be formed by mixing together metal powders of Si and (A and/or B) and optionally (X and/or Y). During the mixing process, the metal powders can be optionally ground. The metals powders typically are pressed together and optionally sintered. Other forming process prior to sintering (e.g., spraying drying, etc.) can be used to form certain shapes (e.g., spherical, etc.). During the sintering process, the metal powders can optionally be heated above the lowest solidus temperature of the components of the MPCs to cause about 0.5-10% (and all values and ranges therebetween) of the components to liquify during the sintering process.

In another non-limiting aspect of the present disclosure, the MPCs have a latent heat of at least 300 J/g. In one non-limiting embodiment, the latent heat of the MPCs is at least 350 J/g. In one non-limiting embodiment, the latent heat of the MPCs is 300-1500 J/g (and all values and ranges therebetween). Current ternary chloride and nitrate salts rely on latent heat, providing 200-250 J/g for a 200-250° C. temperature difference between separate hot and cold tanks.

Using the latent heat of the MPCs, combined with a high temperature molten glass (e.g., glass melting temperature of 400+° C., 800+° C., etc.) or a high temperature molten salt (e.g., salt melting temperature of 400+° C., 800+° C., etc.), a thermal working fluid with at least 2 X (e.g., 2 X-10+X and all values and ranges therebetween) the thermal capacity of current ternary molten salts or molten glasses can be produced that also has at least 10 X (e.g., 10 X-80+X and all values and ranges therebetween) the thermal conductivity and can operate at much higher conversion efficiency. The high temperature storage using MPCs can be nearly double the thermal-electric conversion, as compared to current ternary chloride and nitrate salts or molten glasses, to over 20% (e.g., 20-50+% and all values and ranges therebetween), and 25-70% (and all values and ranges therebetween) for combined heat and power, and can obtain more than 30% (e.g., 30.1-90+% and all values and ranges therebetween) for direct thermal use such as for thermochemical hydrogen production. The MPCs can be engineered to provide maximum heat at specific process conditions, useful for industrial processing. Particularly, the use of MPCs is useful for thermochemical hydrogen generation, steam reforming, and power generation. In another non-limiting aspect of the present disclosure, the MPCs can be formulated to a) operate from 1050-1150° C., b) contain about 3000 J/g or more latent heat during use, c) reduce the footprint of a thermal energy storage system by 10-90% as compared to a thermal energy storage system that uses lithium-ion batteries, and/or d) provide up to a 90% cost savings/MWHr compared to a thermal energy storage system that uses lithium-ion batteries.

In another non-limiting aspect of the present disclosure, the use of MPCs in enhanced molten glass or molten salt allows for direct solar absorption into the molten glass or molten salt, thereby greatly simplifying solar receiver design (e.g., eliminates need for a nickel alloy receiver, etc.). Designs can be used that include flowing the glass over a graphite or ceramic plate (which can be inert) to control moisture exposure with a simple quartz or alumina window.

In another non-limiting aspect of the present disclosure, the MPCs are uncoated or non-coated particles. When the MPCs are uncoated, the MPCs are fully formed of Si-(A and/or B) MPC; Si-(A and/or B)—(X) MPC; and/or Si-(A and/or B)-(X and Y), or can be formed additives in combination with Si-(A and/or B) MPC; Si-(A and/or B)-(X) MPC; and/or Si-(A and/or B)-(X and Y).

In another non-limiting aspect of the present disclosure, the MPCs are partially (e.g., 5-99.9% and all values and ranges therebetween of the outer surface of the MPC is coated) or fully coated particles. When the MPCs include a core that is formed of Si-(A and/or B) MPC; Si-(A and/or B)-(X) MPC; and/or Si-(A and/or B)-(X and Y) and optional additives, and wherein the core is partially or fully coated (e.g., EMPCs), various coating techniques can be use (e.g., vapor deposition [e.g., chemical vapor deposition, physical vapor deposition, etc.]; plasma spraying; coating with a ceramic precursor and then subsequent curing to form a ceramic coating; spray coating; dipping; brushing; rolling; etc.). Non-limiting coatings include SiC, SiOCN, SiCN, $Si_3N_4$, $SiB_6$, $TiO_2$, or an organic polysilazane (PSZ) preceramic polymer. The coating materials can optionally contain a filler (e.g., one or more nanoparticles, nanosheets, and/or nanofibers [e.g., nanoparticles of fluorinated polyhedral oligomeric silsesquioxane (F-POSS), nanoparticles of graphene, nanoparticles of graphene oxide, fumed silica nanoceramics, boron nitride nanosheets, carbon nanotubes, nanoclays, metal powders [e.g., Al powder, Mn powder, Ni powder, Fe powder, carbon powder, etc.], silica, exfoliated nano-fillers, carbon nanofibers, boron nanofibers, nanofibers including conductive nanofibers, nanoparticles of fluorinated silane, nanoparticles of silicone, ceramic nanospheres, carbon powders, $B_4C$, etc.). The nanoparticles, nanosheets, and nanofibers have a size wherein at least one dimension is 1-10,000 nm (and all values and ranges therebetween). The EMPCs can include one coating composition, or two or more different coating compositions. In one non-limiting embodiment, the EMPCs are partially or fully coated by used of a fluidized bed chemical vapor deposition to deposit silicon nitride and/or silicon carbide via $SiCl_4$+ $NH_3$ and dimethyl dichloro silane (DDS) at 850-1000° C. In another non-limiting embodiment, the EMPCs are partially or fully coated by use of preceramic polymers to apply vitreous carbon (furfural alcohol), SiC, and $Si_3N_4$ polycarbosilizane, and then curing to form $Si_3N_4$, SiCN, SiOCN, and/or SiC coatings. The coating can be fully formed after the coating material is heat treated (e.g., 500-1400° C. and all values and ranges therebetween); however, this is not required. In one non-limiting embodiment, the MPC is coated with a polysilazane preceramic polymer that optionally includes a $B_4C$ (reactive), C-black, and/or n-$TiO_2$ additions in a solvent, followed by drying, curing, and conversion to SiC. A high yield polycarbosilizane inorganic resin can optionally be used. The coating can be thermally cured in an inert or nitrogen environment, and heat treated (e.g., 850-1200° C.) to stabilize/cure the coating. The coating can be optionally applied by spraying in VOC-compliant solvent while mechanically or gas fluidizing the metal powders. The thickness of the coating generally is at least 0.1 nm. In another non-limiting embodiment, the coating thickness is 0.1 nm to 15 microns (and all values and ranges therebetween). In another non-limiting arrangement, the coating thickness is 2-10 microns. In another non-limiting embodiment, the melting temperature of the coating is greater than the melting temperature of the core of the MPC. In one non-limiting formulation, the melting temperature of the coating is at least 50° C. greater (e.g., 50-1800° C. greater and all values and ranges therebetween) than the melting temperature of the core of the MPC. In another non-limiting formulation, the melting temperature of the coating is at least 100° C. greater than the melting temperature of the core of the MPC. In another non-limiting formulation, the melting temperature of the coating is at least 150° C. greater than the melting temperature of the core of the MPC. In another non-limiting formulation, the melting temperature of the coating is at least 200° C. greater than the melting temperature of the core of the MPC. In another non-limiting formulation, the melting temperature of the coating is at least 250° C. greater than the melting temperature of the core of the MPC.

In another non-limiting aspect of the present disclosure, the MPCs can have various shapes and sizes. Non-limiting shapes include spheres, flakes, particles, beads, ribbons, etc. The size of the MPCs have at least one dimension that is from 20-5000 microns (and all values and ranges therebetween). In one non-limiting embodiment, the size of the MPCs have at least one dimension that is from 50-2500 microns. In another non-limiting embodiment, the size of the MPCs have at least one dimension that is from 50-500 microns. In another non-limiting embodiment, the size of the MPCs have at least one dimension that is from 50-200 microns. The shape of the MPCs can be formed by various processes (e.g., gas atomization, via drop formation and mineral oil quench, melt spinning, etc.).

In another and/or alternative non-limiting aspect of the disclosure, the MPCs can exhibit expansion melting (e.g., 4-20 vol. % expansion and all values and ranges therebetween). When the MPCs are optionally coated, the coating is formulated to partially or fully constrain such expansion of the core of the MPCs. Generally, when the MPCs are optionally coated, the coating will not fracture or degrade during the expansion of the core as the MPC is heated and cooled in the thermal fluid.

In another and/or alternative non-limiting aspect of the disclosure, the MPCs can optionally include a sacrificial outer coating to protect the MPCs prior to use. Such sacrificial coatings can include polymer, fine wood dust, and/or other decomposable or porous material.

In another and/or alternative non-limiting aspect of the disclosure, the MPCs can optionally include additives such as a) strain tolerance materials (low modulus—adding porosity via adding low stiffness fillers that can decompose, such as polystyrene, ethyl cellulose, methyl cellulose, plant proteins, or other polymer), b) powders with included porosity, and/or c) carbon microballoons, glass microballoons, ceramic microballoons, and/or or polymer microballoons. These additives can be added to the surface of formed metal alloy of the MPC, added to the metal powders of the MPC prior to compression and/or sintering of the metal powders, and/or added to the optional coating of the MPCs. The additives, when used, constitutes about 0.05-30 wt. % (and all values and ranges therebetween) of the MPC. In one non-limiting embodiment, the additive constitutes 0.05-15 wt. % of the MPC. In one non-limiting embodiment, the additive constitutes 0.05-10 wt. % of the MPC.

In another and/or alternative non-limiting aspect of the disclosure, there is provided an improved thermal energy storage which includes: a) a thermocline molten salt storage tank; b) ternary, quaternary, or quinary eutectic or near eutectic salt; and c) MPCs in slurry or suspension which circulates with the molten salt. In one non-limiting embodiment, the molten salt is a quaternary $CaCl_2$—$MgCl_2$—$KCl$—$NaCl$ salt. The salt may optionally also have fluoride and/or other chloride additions to further decrease the melting point. The salt can optionally include 0.5-6 vol. % colloidal nanoparticles (and all values and ranges therebetween) that are added in addition to the MPCs.

In another and/or alternative non-limiting aspect of the disclosure, there is provided an improved thermal energy storage wherein the average sensible heat is greater than 1.3 J/g/° C., and typically greater than 1.5 J/g/° C., and more typically at least 1.8 J/g/C°.

In another and/or alternative non-limiting aspect of the disclosure, there is provided an improved thermal energy storage wherein the MPCs have a latent heat of 300+J/g.

In another and/or alternative non-limiting aspect of the disclosure, there is provided an improved thermal energy storage wherein the MPCs have a latent heat of at least 400+J/g.

In another and/or alternative non-limiting aspect of the disclosure, there is provided an improved thermal energy storage wherein the core of the MPCs are encapsulated with a coating which includes, as a component or binder, a preceramic polymer. The coating can optionally be tailored to absorb visible and/or IR energy, and to prevent reradiation of energy. empc In another and/or alternative non-limiting aspect of the disclosure, there is provided an improved thermal energy storage wherein the coating for the MPC is at least partially formed from a preceramic polymer such as, but not limited to, a polysilazane and/or polycarbosilane polymer. In one non-limiting embodiment, the preceramic polymer includes an organic polysilazane compound (e.g., Durazane® 1500 and/or Durazane® 1800).

In another and/or alternative non-limiting aspect of the disclosure, there is provided an improved thermal energy storage wherein the coating for the MPC is at least partially includes high thermal conductivity fillers, and/or which includes light absorbing (emissivity and absorptivity modifying) nanoparticles or phases. In one non-limiting embodiment, the one or more fillers include, but are not limited to, boron nitride, carbon, graphene, boron nitride nanosheets, carbon nanofibers, alumina, silica, ceria, zirconia, and/or titanium oxide.

In another and/or alternative non-limiting aspect of the disclosure, there is provided an improved thermal energy storage wherein the MPCs are neutrally buoyant with the other components of the thermal fluid when the thermal fluid is heated and cooled.

In another and/or alternative non-limiting aspect of the disclosure, there is provided an improved thermal energy storage which includes a provision for stirring/recirculation in the hot or cold tank, or both, to maintain suspension of MPCs and nanoparticles in thermal fluid when the thermal fluid is heated and cooled.

In another and/or alternative non-limiting aspect of the disclosure, there is provided an improved thermal energy storage that utilizes a thermal fluid that includes a) a salt and/or glass, b) MPCs, and c) optionally nanoparticles.

In another and/or alternative non-limiting aspect of the disclosure, there is provided an improved thermal energy storage utilizing a thermal fluid that includes a salt, wherein the salt constitutes 40-95 vol. % of the thermal fluid (and all values and ranges therebetween). The salt can include one or more of a) sodium nitrate/potassium nitrate (e.g., 40-70 wt. % sodium nitrate [and all values and ranges therebetween]/40-60 wt. % potassium nitrate [and all values and ranges therebetween], etc.), b) a ternary salt mixture of $NaNO_3$/$KNO_3$/$NaNO_2$ (e.g., 2-10 wt. % $NaNO_3$ [and all values and ranges therebetween]/45-65 wt. % $KNO_3$ [and all values and ranges therebetween]/32-48 wt. % $NaNO_2$ [and all values and ranges therebetween], etc.), c) carbonate and fluoride salts that optionally include lithium (e.g., $K_2CO_3$/$Li_2CO_3$/$Na_2CO_3$ [30-35 wt. % $K_2CO_3$ [and all values and ranges therebetween]/32-39 wt. % $Li_2CO_3$ [and all values and ranges therebetween]/31-39 wt. % $Na_2CO_3$ [and all values and ranges therebetween], etc.), d) LiNaK fluorides (e.g., KF/LiF/NaF [52-65 wt. % KF [and all values and ranges therebetween]/23-34 wt. % LiF [and all values and ranges therebetween]/9-15 wt. % NaF [and all values and ranges therebetween], etc.), e) ZnNaK chlorides (e.g., KCl/NaCl/$ZnCl_2$ [20-26 wt. % KCl [and all values and ranges therebetween]/5-10 wt. % NaCl [and all values and ranges therebetween]/62-72 wt. % $ZnCl_2$ [and all values and ranges therebetween], etc.), f) MgNaK chlorides (e.g., 14-25 wt. % KCl [and all values and ranges therebetween]/52-72 wt. % $MgCl_2$ [and all values and ranges therebetween]/10-25 wt. % NaCl [and all values and ranges therebetween]), g) $AlCl_3$—NaCl—KCl, h) $ZnCl_2$—NaCl—KCl, i) $FeCl_3$—NaCl—KCl, j) NaCl—$CaCl_2$—$MgCl_2$, and/or k) KCl—NaCl—$CaCl_2$—$MgCl_2$, which salt can optionally include fluoride. The salt has a melting point of at least 140° C. (e.g., 140-1000° C. and all values and ranges therebetween), typically at least 200° C., and more typically at least 300° C. The average heat capacity of the salt at 400° C. is at least 0.8 kJ/kg/K (e.g., 0.8-2.2 kJ/kg/K and all values and ranges therebetween), typically is at least 0.9 kJ/kg/K, and more typically is at least 1 kJ/kg/K. The density of the salt is about 0.8-2.2 g/cm$^3$ (and all values and ranges therebetween), typically 0.9-1.4 g/cm$^3$, and more typically 0.9-1.1 g/cm$^3$.

In another and/or alternative non-limiting aspect of the disclosure, there is provided an improved thermal energy storage that utilizes a thermal fluid wherein the MPCs constitute 2-60 vol. % (and all values and ranges therebetween) of the thermal fluid. In another and/or alternative non-limiting aspect of the disclosure, there is provided an improved thermal energy storage that utilizes a thermal fluid wherein the MPCs constitute 5-40 vol. % of the thermal fluid. In another and/or alternative non-limiting aspect of the disclosure, there is provided an improved thermal energy storage that utilizes a thermal fluid wherein the MPCs constitute 10-30 vol. % of the thermal fluid.

The MPCs may or may not be encapsulated or coated, and have a particle size that is generally no more than 500 microns (e.g., 10-500 microns and all values and ranges therebetween). In one non-limiting embodiment, the MPCs 1) are formed of two or more metals [e.g., 35-50 wt. % Al (and all values and ranges therebetween), 20-50 wt. % Mg (and all values and ranges therebetween), 15-30 wt. % Si (and all values and ranges therebetween), and optionally 0.1-25 wt. % Ca (and all values and ranges therebetween], 2) have an average heat capacity at least 1.5 J/g/° C., 3) have an available working temperature difference of at least 300° C., 4) have a high latent heat of fusion (e.g., greater than 180 J/g), 5) have a melting point range that is generally from 450-1500° C. (and all values and ranges therebetween), 6) have a particle density of 1.05-2.2 g/cc (and all values and ranges therebetween), 7) have a particle size of 10-500 microns (and all values and ranges therebetween), and/or 8) have a thermal conductivity of greater than 50 W/m-K (e.g., 50-350 W/m-K and all values and ranges therebetween). The MPCs are optionally formulated to expand about 6-20 vol. % (and all values and ranges therebetween) when melted. When the MPCs includes a coating, the coating can include oxides, salts, metals, ceramics, or polymers. In one non-limiting embodiment, the coating includes a polysilazane preceramic polymer. In another non-limiting embodiment, the coating is a Si based compound. The coating can optionally include high thermal conductivity fillers (e.g., boron nitride, boron nitride nanosheets, metal particles, alumina and/or other oxide particles, etc.) The filler material (when included in the coating) constitutes 0.5-60 wt. % (and all values and ranges therebetween) of the coating. The thickness of the coating (when used) is 0.1-10% of the particle diameter (and all values and ranges therebetween).

In another non-limiting aspect of the invention, the thermal fluid includes a glass. The glass can optionally be a "low temperature glass" in which the viscosity is about (700-1200 pa-s at 700-800° C. (which is about 200° C. less than normal commercial glasses.), and which has a low temperature dependence of viscosity at temperatures below the working point. Such glass melts would typically have a low glass transition temperature ($T_g$~400-450° C.). A wide variety of glasses exists with such viscosities. Several commercial glaze and sealing glasses are candidates, but many contain Pb oxides. Commercial sealing glasses with a simple Ca(PO$_3$)$_2$ composition can be used, but the stability of such glasses at higher temperatures and the rate of reactions of second phase (phase change) metal is likely to be too high, thus and more complex composition glasses may be required in certain applications. Replacing the Pb with Sn, Be, and/or V has been shown to produce alternate lead free sealing glasses which flow at low temperatures and are relatively compatible with metal and ceramic materials. Such glasses have viscosities in the range of 700-1200 Pa-s or less at temperatures near 800° C. Such glasses are thermally stable, and have limited interaction or reaction when in a molten state with SiC, refractor bricks, nickel alloys, refractory metals such as molybdenum or niobium, or superalloys. In one non-limiting embodiment, ternary and quaternary phosphate and borate glasses can be used that exhibit a desirable viscosity and stability. Such non-limiting glasses includes:

a. M$_2$O-M'O—R$_2$O$_3$— P$_2$O$_5$
b. M$_2$O-M'O—R$_2$O$_3$—B$_2$O$_3$
c. Same as "a" or "b" with SiO$_2$ additions on the order of 1-20 wt. % (and all values and ranges therebetween).

In another and/or alternative non-limiting aspect of the disclosure, there is provided an improved thermal energy storage that utilizes a thermal fluid that optionally includes colloidal nanoparticles, and wherein the colloidal nanoparticles (when used) constitute 0.5-10 wt. % (and all values and ranges therebetween) of the thermal fluid. The colloidal nanoparticles can include, but are not limited to, metal and/or metal oxide nanoparticles and/or non-metal oxide nanoparticles. Non-limiting examples of colloidal nanoparticles include SiO$_2$, ZnO, Al$_2$O$_3$, TiO$_2$, MgO, Fe$_2$O$_3$, BaTiO$_3$, Ce$_2$O$_3$, ZrO$_2$, and/or CaO nanoparticles, and/or metal nanoparticles (e.g., Ni, Mo, Si, Re, W, Au, Ag, Nb, Ta, and/or other salt-stable metal nanoparticles). The average particle diameter of the colloidal nanoparticles is 10-200 nm (and all values and ranges therebetween).

In another and/or alternative non-limiting aspect of the disclosure, the MPCs can be mixed with salts. Salts can be used in temperatures ranges of 400-1000° C. (and all values and ranges therebetween). Salts 1) have a fairly high volumetric expansions on melting (±15% and all values and ranges therebetween), 2) are low thermal conductivity/thermally insulating, and/or 3) have a latent heat of fusion that is relatively low compared to the MPCs. For operation in the molten salt regime, MPCs formed of Si and Mg, Al and/or Ca can be used; however, it will be appreciated that other types of MPCs can be used with molten salt. MPCs formed of alloys of Mg, Al, and Si (plus optionally Ca) can be produced with tailored melting points from 450-800+° C. In particular, compositions in the range of 35-50 wt. % Al (and all values and ranges therebetween), 20-50 wt. % Mg (and all values and ranges therebetween), 15-30 wt. % Si (and all values and ranges therebetween), and optionally 0.1-25 wt. % Ca (and all values and ranges therebetween) offer suitable melting points and melting temperatures for use in MPCs in accordance with the present disclosure.

In another and/or alternative non-limiting aspect of the disclosure, the MPCs that are optionally encapsulated are can optionally be formulated to expand about 6-20 vol. % (and all values and ranges therebetween) when melted, and typically 10-12 vol. % when melted. The use of the coating can optionally be used to maintain the desired size of the MPC in the molten salt and/or glass, and/or maintain the desired compatibility of the MPCs (e.g., inertness, etc.) with the molten salt and/or glass.

In another and/or alternative non-limiting aspect of the disclosure, the following properties are desirable, but are not required, for MPCs:

High latent heat of fusion—300+J/g.

A melting point range is generally from 450-1500° C. (and all values and ranges therebetween). For chloride molten salt systems, the melting point range is generally from 500-750° C. For industrial processing applications, the melting point range is generally 600-1000° C. Non-limiting examples of melting point ranges for the molten salt and turbine cycle includes 600-720° C., 550-650° C., and 450-550° C.]

Particle density is optionally selected to be between the densities of the hot and cold fluids-matching the cold fluid when solid, and the hot fluid when molten. However, a value independent between the hot and cold fluids is achievable, and is generally from 1.05-2.2 g/cc (and all values and ranges therebetween). In one non-limiting example, the particle density is from 1.8-2.2 g/cc, and typically 1.9 g/cc±0.1. For molten chloride salts, the particle density can be as low as 1.05 g/cc.

The MPCs can optionally be mixed in the molten salt and/or glass and pumped as a slurry through the receiver and heat exchangers. To allow for flow, in addition to density, a fine-sized particle is used which is generally no greater than 500 microns (e.g., 10-500 microns and all values and ranges therebetween), typically 25 microns (325 mesh) to 200 microns (100 mesh), and more typically 50-125 microns. Too small of a particle can lead to higher viscosity, and excess loss to the inert encapsulation material. Too large of a particle has excessive tendencies to settle or float, and cannot melt or solidify quickly enough in the heat exchangers, leading to excessively large heat exchangers. The particle size is typically selected for a heat exchanger or receiver such that the exposure time of the particle is based on a melting time under heat exchanger thermal flux is from 0.5-20 seconds residence time (and all values and ranges therebetween), and typically 1-5 seconds residence time.

The particle thermal conductivity is typically high to meet melting time requirements. Thermal conductivity of the MPCs is generally greater than 50 W/m-K (e.g., 50-350 W/m-K and all values and ranges therebetween), typically greater than 100 W/m-K, more typically greater than 150 W/m-K, and even more typically greater than 200 W/m-K.

The optional encapsulation or coating material for the MPCs (when used) is generally selected to be compatible with the molten salt and/or glass, have good thermal conductivity, have a fairly low density, and/or form a thin coating on the MPC alloy. The desirable coating material should be easily applied, such as by plating, spray-coating, CVD, or solution deposition. Suitable techniques include sol-gel synthesis (oxides), plating (molten salt or electroless (metals), CVD, or via polymer chemistry. In one non-limiting embodiment, the coating or encapsulation includes polysilazane pre-ceramic polymer, where the polysilazane can optionally include high thermal conductivity fillers such as, but not limited to, boron nitride, boron nitride nanosheets, titanium oxide, metal particles, alumina and/or other oxide particles to enhance the thermal conductivity of the coating and to modify the strength of the coating. The filler content in the coating material is generally 0-60 wt. % (and all values and ranges therebetween), and typically 0-40 wt. %. When the coating material includes filler, the filler content is generally at least 0.5 wt. %. The thickness of the coating layer can be 1-25% (and all values and ranges therebetween) of the metal alloy diameter of the MPC.

In another non-limiting aspect of the present disclosure, the apparatus and method for storing thermal energy optionally includes the use of a baffled thermocline tank having a high heat capacity thermal energy storage system and wherein MPCs, which are optionally encapsulated, are circulated with the molten salt and/or glass. Heat can be added to the tank by 1) pumping cold fluid from the base of the tank, then 2) through a heat exchanger, solar receiver, and/or electrical heater cell, and then 3) returned to the top of the tank. When charging the tank, a baffle can be optionally used in the lower portion of the tank. When drawing heat from the tank, fluid can be 1) pumped from the top of the tank, then 2) to the heat exchanger and/or other heat load, and then 3) returned to the bottom of the tank. The thermal fluid include a molten salt, molten glass, and/or other fluid. The thermal fluid includes coated MPCs that have a core with a melting point that is optionally between the hot and cold fluid temperatures of the thermal fluid during the circulation of the thermal fluid in the thermal energy system. The thermal fluid can also, or alternatively, optionally include high heat capacity, or energy absorbing (IR and divisible) nanoparticles to enhance the energy storage, to allow for the reduction in the size of the tank, and/or to allow for direct heating of the salt and/or glass.

In another non-limiting aspect of the present disclosure, the tank can optionally be insulated with a cold wall to minimize thermal ratcheting during use, and/or may optionally be lined with an impermeable layer with controlled CTE and/or stiffness.

In another non-limiting aspect of the disclosure, the MPCs are formulated to be circulated with the other components of the thermal fluid, thereby receiving or delivering their latent heat at to a heat receiver or load heat exchanger.

In another and/or alternative non-limiting aspect of the disclosure, applications for the apparatus for storing thermal energy in accordance with the present disclosure include portable or relocatable energy storage, energy storage for ships and rail, space applications, industrial processing applications, and nuclear and solar applications.

Another non-limiting object of the present disclosure is directed to an improved thermal energy storage system which includes a) a storage tank; b) a thermal fluid wherein the thermal fluid includes one or more of glass, a ternary salt, a quaternary salt, and/or a quinary salt; and c) a metallic phase change material (MPC); wherein the MPC includes a metallic mixture having a melting temperature that falls within a temperature range of 400-1500° C. (e.g., 650-1250° C., 850-1150° C., etc.), and wherein the MPC is formulated to be reusable in a temperature environment of at least 400° C.

Another non-limiting object of the present disclosure is directed to an improved thermal energy storage system wherein the MPC is formulated to be reusable in a temperature environment of at least 800° C.

Another non-limiting object of the present disclosure is directed to an improved thermal energy storage system wherein the MPC is formulated to be reusable in a temperature environment of 800-1200° C.

Another non-limiting object of the present disclosure is directed to an improved thermal energy storage system wherein the thermal fluid includes a salt eutectic or near eutectic salt.

Another non-limiting object of the present disclosure is directed to an improved thermal energy storage system wherein the salt includes one or more of a) sodium nitrate/potassium nitrate, b) a ternary salt mixture of $NaNO_3$/$KNO_3$/$NaNO_2$, c) carbonate and fluoride salts, d) LiNaK fluorides, e) ZnNaK chlorides, f) MgNaK chlorides, g) $AlCl_3$—NaCl—KCl, h) $ZnCl_2$—NaCl—KCl, i) $FeCl_3$—NaCl—KCl, j) NaCl—$CaCl_2$—$MgCl_2$, and/or k) KCl—NaCl—$CaCl_2$—$MgCl_2$.

Another non-limiting object of the present disclosure is directed to an improved thermal energy storage system wherein the thermal mixture includes 5-80 vol. % MPCs and 20-95 vol. % salt or glass.

Another non-limiting object of the present disclosure is directed to an improved thermal energy storage system wherein the thermal mixture further includes 0.5 vol. % to 10 vol. % colloidal nanoparticles.

Another non-limiting object of the present disclosure is directed to an improved thermal energy storage system wherein the colloidal nanoparticles include one or more metals, metal oxides and/or non-metal oxides; and wherein colloidal nanoparticles have at least one dimension that is no more than 200 nm.

Another non-limiting object of the present disclosure is directed to an improved thermal energy storage system wherein the colloidal nanoparticles include one or more materials selected from the group consisting of $SiO_2$, ZnO, $Al_2O_3$, $TiO_2$, MgO, $Fe_2O_3$, $BaTiO_3$, $Ce_2O_3$, $ZrO_2$, CaO, Ni, Mo, Si, Re, Nb, Ta, W, Au, and Ag.

Another non-limiting object of the present disclosure is directed to an improved thermal energy storage system wherein the MPC has a latent heat of at least 300 J/g.

Another non-limiting object of the present disclosure is directed to an improved thermal energy storage system wherein the MPC has a latent heat that falls within the range of 300-2000 J/g.

Another non-limiting object of the present disclosure is directed to an improved thermal energy storage system wherein the metallic mixture of the MPC includes a) Si-(A and/or B) MPC; b) Si-(A and/or B)-(X) MPC; and/or c) Si-(A and/or B)-(X and Y); and wherein A, B, X and Y are elements; and wherein elements for A and B are selected from the group consisting of aluminum, copper, boron, germanium, and magnesium; and wherein elements for X and Y are selected from the group selected from the group consisting of aluminum, calcium, chromium, cobalt, copper, iron, magnesium, manganese and nickel.

Another non-limiting object of the present disclosure is directed to an improved thermal energy storage system wherein the metallic mixture of the MPC includes one or more materials selected from the group consisting of Si—Al, Si—Mg—Cu, Si—Mg, S—Al—Ca, Si—Cu—Ca, Si—Ge, Si—B, Si—Ge—B, Si—Ge—Fe, Si—Ge—Mn, Si—Ge—Fe—Mn, Si—Ge—Cu, Si—Ge—Ni, Si—Ge—Cr, Si—Ge—Cu—Fe, Si—Ge—Ni—Fe, and Si—Ge—Cr—Fe.

Another non-limiting object of the present disclosure is directed to an improved thermal energy storage system wherein the metallic mixture of the MPC includes at least 10 wt. % Si; and one or more of a) at least 10 wt. % Al, b) at least 10 wt. % B; c) at least 10 wt. % Cu, d) at least 10 wt. % Ge, and e) at least 10 wt. % Mg.

Another non-limiting object of the present disclosure is directed to an improved thermal energy storage system wherein the MPC includes an outer coating; and wherein the outer coating includes one or more materials selected from the group consisting of SiC, SiOCN, SiCN, $Si_3N_4$, $SiB_6$, $TiO_2$, and an organic polysilizane preceramic polymer.

Another non-limiting object of the present disclosure is directed to an improved thermal energy storage system wherein the coating includes filler; said filler including one or more materials selected from the group consisting of carbon fibers, boron fibers, ceramic spheres, carbon powders, $TiO_2$, and $B_4C$.

Another non-limiting object of the present disclosure is directed to an improved thermal energy storage system wherein the coating has a thickness of 1 to 150 microns.

Another non-limiting object of the present disclosure is directed to an improved thermal energy storage system wherein the MPC has a size having at least one dimension that is from 20-5000 microns.

Another non-limiting object of the present disclosure is directed to a method for storing energy in a thermal energy storage system comprising a) providing a thermal fluid; said thermal fluid includes one or more of glass, a ternary salt, a quaternary salt, and/or a quinary salt, and a metallic phase change material (MPC); and wherein the MPC including a metallic component having a melting temperature that falls within a temperature range of 400° C. to 1500° C.; and wherein the MPC is formulated to be reusable in a temperature environment of at least 400° C.; and b) heating said thermal fluid.

Another non-limiting object of the present disclosure is directed to a metallic phase change material (MPC); and wherein the MPC including a metallic mixture having a melting temperature that falls within a temperature range of 400-1500° C.; and wherein the MPC is formulated to be reusable in a temperature environment of at least 400° C.; and wherein the metallic mixture of the MPC includes a) Si-(A and/or B) MPC; b) Si-(A and/or B)-(X) MPC; and/or c) Si-(A and/or B)-(X and Y); said A, B, X and Y are elements; and wherein the elements for A and B are selected from the group consisting of aluminum, copper, boron, germanium, and magnesium; and wherein the elements for X and Y are selected from the group selected from the group consisting of aluminum, calcium, chromium, cobalt, copper, iron, magnesium, manganese, and nickel.

Another non-limiting object of the present disclosure is directed to an improved thermal energy storage system which includes a) a storage tank; b) a thermal fluid, said thermal fluid includes i) glass and/or salt; and ii) a metallic phase change material (MPC), said MPC is mixed with said thermal fluid to form a thermal mixture, said MPC includes an encapsulated metallic mixture having a melting temperature or range that falls within a temperature range of 400-1500° C., said MPC is formulated to be reusable in a temperature environment of at least 400° C.

Another non-limiting object of the present disclosure is directed to a thermal energy storage system wherein the MPC has a particle size of 20-2000 microns.

Another non-limiting object of the present disclosure is directed to a thermal energy storage system wherein the MPC includes a core and coating, said core formulated to have a liquidus temperature of 550-750° C., said MPC formulated to be reusable to a temperature of at least 700° C.

Another non-limiting object of the present disclosure is directed to a thermal energy storage system wherein the MPC includes a core and coating, said core formulated to have a liquidus temperature of at least 400° C., said MPC formulated to be reusable in a temperature environment of at least 800° C., said MPC includes at least 20 wt. % Si metal.

Another non-limiting object of the present disclosure is directed to a thermal energy storage system wherein the MPC includes a core and coating, said MPC formulated to be reusable to a temperature of 800-1200° C.

Another non-limiting object of the present disclosure is directed to a thermal energy storage system wherein said thermal fluid includes a ternary salt, a quaternary salt, and/or a quinary salt.

Another non-limiting object of the present disclosure is directed to a thermal energy storage system wherein said thermal fluid includes a eutectic salt or near eutectic salt, or a eutectic glass or near eutectic glass.

Another non-limiting object of the present disclosure is directed to a thermal energy storage system wherein the molten salt includes one or more of a) sodium nitrate/potassium nitrate, b) a ternary salt mixture of $NaNO_3$/$KNO_3$/$NaNO_2$, c) carbonate and fluoride salts, d) LiNaK fluorides, e) ZnNaK chlorides, f) MgNaK chlorides, g) $AlCl_3$—NaCl—KCl, h) $ZnCl_2$—NaCl—KCl, i) $FeCl_3$—NaCl—KCl, j) NaCl—$CaCl_2$—$MgCl_2$, and/or k) KCl—NaCl—$CaCl_2$—$MgCl_2$ or the molten glass is a phosphate or borate low melting point glass.

Another non-limiting object of the present disclosure is directed to a thermal energy storage system wherein said thermal mixture includes 5-80 vol. % MPC and 20-95 vol. % salt and/or glass.

Another non-limiting object of the present disclosure is directed to a thermal energy storage system wherein said thermal mixture further includes 0.5-10 vol. % colloidal nanoparticles.

Another non-limiting object of the present disclosure is directed to a thermal energy storage system wherein said colloidal nanoparticles include one or more metals, metal oxides, and/or non-metal oxides; said colloidal nanoparticles have at least one dimension that is no more than 200 nm.

Another non-limiting object of the present disclosure is directed to a thermal energy storage system wherein said colloidal nanoparticles include one or more materials selected from the group consisting of $SiO_2$, ZnO, $Al_2O_3$, $TiO_2$, MgO, $Fe_2O_3$, $BaTiO_3$, $Ce_2O_3$, $ZrO_2$, CaO, Ni, Mo, Si, Re, Nb, Ta, W, Au, and Ag.

Another non-limiting object of the present disclosure is directed to a thermal energy storage system wherein said MPC has a latent heat of at least 300 J/g, or has a latent heat that falls within the range of 300-2000 J/g.

Another non-limiting object of the present disclosure is directed to a thermal energy storage system wherein said MPC includes a) Si-(A and/or B) MPC; b) Si-(A and/or B)-(X) MPC; and/or c) Si-(A and/or B)-(X and Y); said A, B, X and Y are elements; said elements for A and B are selected from the group consisting of aluminum, copper, boron, germanium, and magnesium; said elements for X and Y are selected from the group consisting of aluminum, calcium, chromium, cobalt, copper, iron, magnesium, manganese, and nickel.

Another non-limiting object of the present disclosure is directed to a thermal energy storage system wherein said MPC includes at least 10 wt. % Si; and one or more of a) at least 10 wt. % Al, b) at least 10 wt. % B; c) at least 10 wt. % Cu, d) at least 10 wt. % Ge, and e) at least 10 wt. % Mg.

Another non-limiting object of the present disclosure is directed to a thermal energy storage system wherein said MPC includes an outer coating; said outer coating includes one or more materials selected from the group consisting of SiC, SiOCN, SiCN, $Si_3N_4$, $SiB_6$, $TiO_2$, and an organic polysilizane preceramic polymer.

Another non-limiting object of the present disclosure is directed to a thermal energy storage system wherein said coating includes filler, said filler including one or more materials selected from the group consisting of carbon fibers, boron fibers, ceramic spheres, carbon powders, $TiO_2$, SIC powder, Boron nitride, and $B_4C$.

Another non-limiting object of the present disclosure is directed to a thermal energy storage system wherein said coating has a thickness of 1 to 500 microns.

Another non-limiting object of the present disclosure is directed to a thermal energy storage system wherein said MPC has a size having at least one dimension that is from 20-5000 microns.

Another non-limiting object of the present disclosure is directed to a method for storing energy in a thermal energy storage system comprising: a)providing a thermal fluid, said thermal fluid includes i) one or more of glass, a ternary salt, a quaternary salt, and/or a quinary salt; and ii) a metallic phase change material (MPC); said MPC including a metallic component having a melting temperature that falls within a temperature range of 400-1500° C.; said MPC is formulated to be reusable in a temperature environment of at least 400° C.; and b) heating said thermal fluid.

Another non-limiting object of the present disclosure is directed to a metallic phase change material (MPC), said MPC including a metallic mixture having a melting temperature that falls within a temperature range of 400-1500° C., said MPC is formulated to be reusable in a temperature environment of at least 400° C.; said metallic mixture of said MPC includes a) Si-(A and/or B) MPC; b) Si-(A and/or B)-(X) MPC; and/or c) Si-(A and/or B)-(X and Y); said A, B, X and Y are elements; said elements for A and B are selected from the group consisting of aluminum, copper, boron, germanium, and magnesium; said elements for X and Y are selected from the group selected from the group consisting of aluminum, calcium, chromium, cobalt, copper, iron, magnesium, manganese, and nickel.

Another non-limiting object of the present disclosure is directed to a MPC, wherein said MPC includes a mixture of silicon metal and alloying elements to control a liquidus and solidus of said MPC to a temperature from 550° C. to 1250° C.; said MPC including a ceramic or ceramic composite coating.

Another non-limiting object of the present disclosure is directed to a MPC, wherein said MPC includes at least 20 wt. % Si and one or more alloying elements selected from the group consisting of Al, Mg, Ge, Fe, Ni, Cu, Mn, and Cr.

Another non-limiting object of the present disclosure is directed to a MPC, wherein said MPC has a particle size is of 20-2000 microns.

Another non-limiting object of the present disclosure is directed to a MPC, wherein said MPC has a coating thickness of 1-200 microns.

Another non-limiting object of the present disclosure is directed to a MPC, wherein said MPC has a latent heat of at least 300 J/g, or at least 800 J/g, or at least 1000 J/g.

Another non-limiting object of the present disclosure is directed to a MPC, wherein said metallic mixture is not an eutectic mixture.

Another non-limiting object of the present disclosure is directed to a MPC, wherein said metallic mixture includes 20-80 wt. % Si, and 20-80 wt. % of one or more of Mg, Al, Mn, Cr, Fe, Ge, and/or Cu.

Another non-limiting object of the present disclosure is directed to a MPC, wherein said metallic mixture includes Si and two or more of Mn, Fe, Cr, Cu, Al, Mg, and/or Ge.

Another non-limiting object of the present disclosure is directed to a MPC, wherein said metallic mixture includes Si and at least 1-25 wt. % of B.

Another non-limiting object of the present disclosure is directed to a MPC, wherein said MPC includes a coating to modify its properties, including reactivity, emissivity, and/or adsorptivity.

Another non-limiting object of the present disclosure is directed to a MPC, wherein said MPC has a shape that is selected from the group consisting of a sphere, an elliptical spheroid, a rounded cube, a flake, a prism, a cylinder, a rod, a cuboid, or a fiber.

Another non-limiting object of the present disclosure is directed to a MPC, wherein said MPC is embedded and/or contained in or attached to a structure, alloy, and/or cavity for the function of controlling transient thermal response to a thermal load in such structure, alloy, and/or cavity.

Another non-limiting object of the present disclosure is directed to a MPC, wherein wherein said MPC is part of a thermal fluid that is used in a thermal energy storage system, and wherein said MPC is transported in said thermal fluid by gravity, mechanical means, gas entrainment, or fluid transport to a heat consuming or transfer device such as a heat exchanger, process vessel, reactor, or fluidized bed.

Another non-limiting object of the present disclosure is directed to a MPC, wherein said thermal fluid includes i) a molten salt, ii) a molten glass, or iii) a process gas which includes hydrogen, steam, $CO_2$, methane, hydrocarbon, Helium, Xenon, argon, and/or ammonia.

Another non-limiting object of the present disclosure is directed to a MPC, wherein said MPC is part of a thermal fluid that is used in a thermal energy storage system, and wherein heat to said thermal fluid supplied from i) a resistance heating element, ii) process heat from an industrial operation, iii) solar energy, or iv) nuclear energy.

Another non-limiting object of the present disclosure is directed to a MPC, wherein said MPC is part of a thermal fluid that is used in a thermal energy storage system, and wherein said MPC in said thermal fluid is heated by direct radiation/absorption.

Another non-limiting object of the present disclosure is directed to a MPC, wherein said MPC is part of a thermal fluid that is used in a thermal energy storage system, and wherein said MPC in said thermal fluid is used to heat a liquid or gaseous working fluid by direct or indirect contact.

Another non-limiting object of the present disclosure is directed to a MPC, wherein said MPC is part of a thermal fluid that is used in a thermal energy storage system designed and sized for long term energy storage of at least 4 hours.

Other aspects, advantages and novel features of the present disclosure will become apparent from the following detailed description and figures of the disclosure.

BRIEF DESCRIPTION OF THE DRAWINGS

These and other features of the disclosure can be best understood from the following specification and one or more drawings, the following of which is a brief description.

DETAILED DESCRIPTION OF NON-LIMITING EMBODIMENTS

Figure 1:
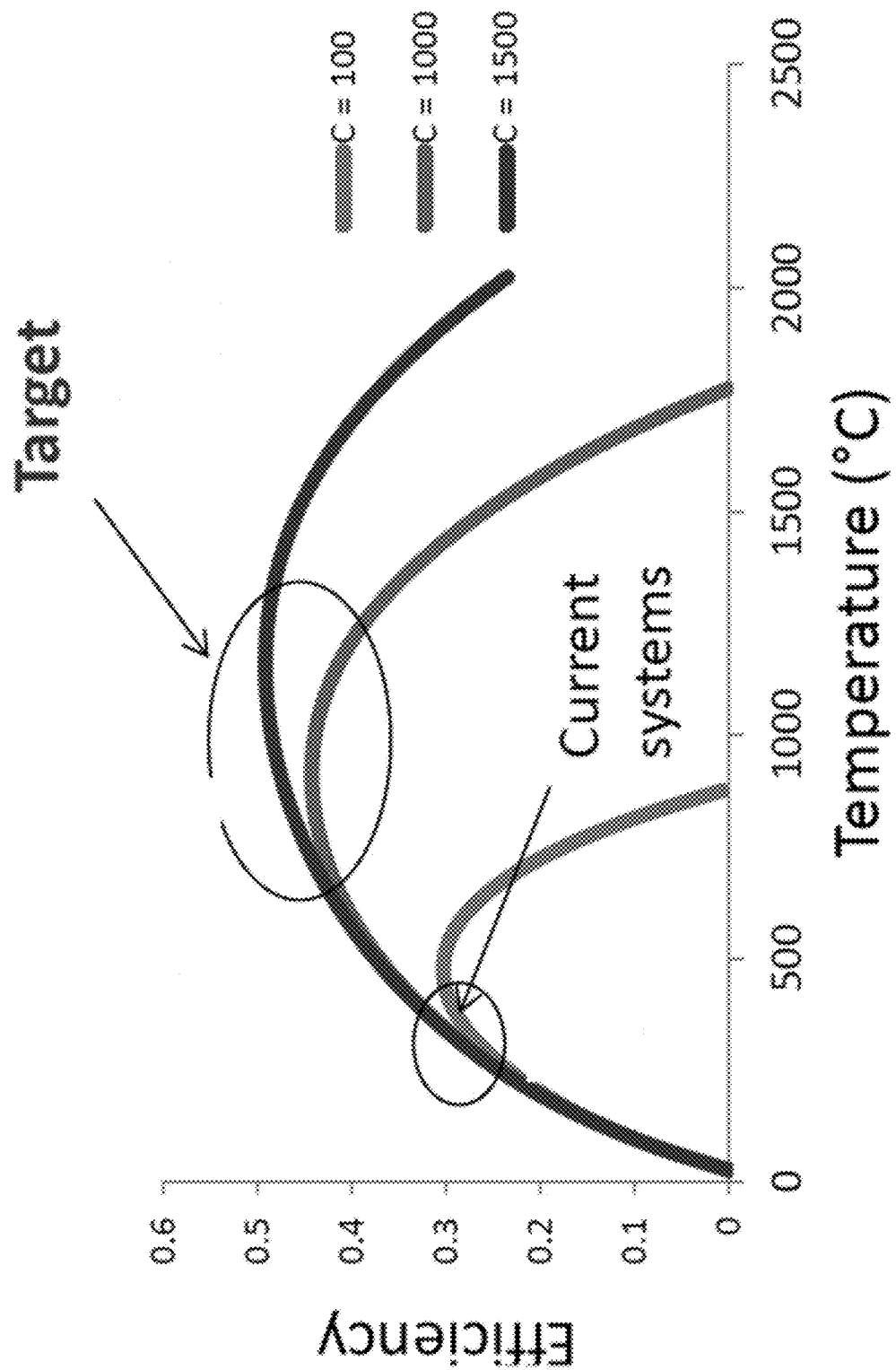
FIG. 1 is a graph that illustrates the improvement in thermal-electric conversion efficiencies with increasing temperature.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, all the intermediate values and all intermediate ranges).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Figure 2:
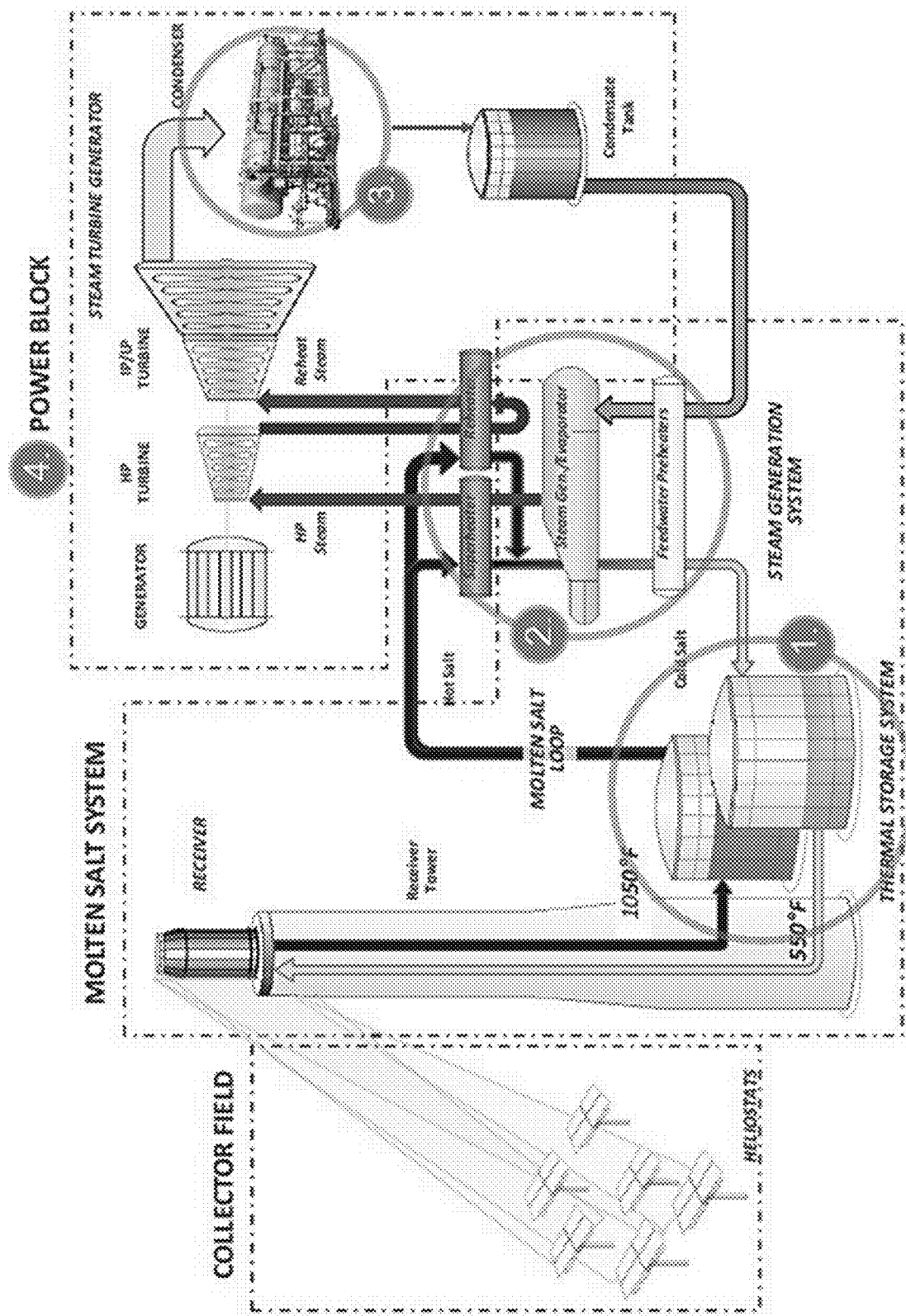
FIG. 2 illustrates a non-limiting Concentrating Solar Power (CSP) plant that use mirrors to concentrate the sun's energy to drive traditional steam turbines or engines that create electricity.

In one non-limiting configuration, the improved thermal energy storage includes one or more thermocline molten salt storage tanks, a thermal fluid that includes a ternary, quaternary, or quinary eutectic or near eutectic salt, and MPCs in slurry or suspension which circulates with the molten salt. As illustrated in FIG. 2, the thermal fluid is communicated to and from two thermal storage tanks or thermocline storage tanks. One of the thermocline storage tanks is a cold storage tank and the other storage tank is a hot storage tank. As can be appreciated, a single tank can be used to store both the hot and cold thermal fluid. "Cold" thermal fluid, which is around 550-780° F. (288-450° C.) in one example, is communicated from the cold storage tank through the central receiver system where it is heated. The "hot" thermal fluid, in the example, is around 1050-2000° F. (566-1100° C.), is then communicated to the hot storage tank. When power or thermal energy is required, the hot thermal fluid is pumped to a steam, $CO_2$, air, or other working fluid generator system that produces steam or high-pressure working fluid. The working fluid drives a turbine/generator that creates electricity for communication to a power grid or other use. The thermal fluid is returned to the cold storage tank where it is stored and eventually reheated in the central receiver system. It should be understood that although a particular component arrangement is disclosed in the illustrated embodiment, any arrangement that utilizes a thermal storage tank system would also benefit from the disclosed examples.

When the thermal storage tank system is only formed of a single thermocline storage tank, such design is based on the principle that hot thermal fluid in a quiescent environment tends to rise and stay above colder thermal fluid in the same tank. This phenomenon is also known as thermal stratification as temperature versus distance from the bottom of the storage tank. A thermocline or thermogradient region is the layer in which temperature changes more rapidly with change in depth than do the temperatures in the layers above or below. As the temperature of the hot thermal fluid decreases in the hot storage region, its density increases and it tends to "fall" unless the thermal fluid below it is also cooling at an equal or greater rate. The relative densities of the thermal fluid determine its elevational position within the tank. The cold thermal fluid in the cold storage region is denser than the hot thermal fluid in the hot storage region. The fact that molten salt has a relatively low thermal conductivity tends to aid in this stratification effect. Molten salt can be thought of as liquid insulation. A thermocline region naturally develops and separates the cold and hot storage regions. However, this natural separation does not provide efficient enough storage for use in solar power systems.

The single thermocline storage tank, when used, can include a wall operatively secured to a bottom wall to provide a cavity. The wall includes a portion having a geometry or shape interiorly arranged within the storage tank. A baffle assembly can be arranged in the thermocline region. A baffle is an obstruction used to substantially separate the cold and hot storage regions.

The flows in and out of the hot and cold pools in the single thermocline storage tank can disturb the inherent quiescent nature of the thermal stratification. The baffle assembly in the single thermocline storage tank limits mixing of fluid between the cold and hot storage regions by substantially physically separating the cavity into the cold and hot storage regions, as well as reducing thermal transfer and leakage between the thermal fluids. If the baffle is sealed to the tank wall, such as through flexible metal bellows with or without anti-wear coatings, the baffle may be driven mechanically (using cables, screws, or hydraulics) to drive thermal fluid from the hot to cold tank. A dual baffle system (with one baffle at the hot/cold interface and one at the hot/head space interface) can be used to drive the thermal fluid in both directions. In one embodiment, the intermediate baffle is driven from a drive system in the low-temperature thermal fluid (which can be made from standard materials), and the hot side baffle is driven by connections in the head space (which can be cooled, and which are not exposed to the corrosive molten salt). Alternatively, conventional pumps can be used at the tank base (cold fluid) and at the top of the tank (hot thermal fluid). Due to the near constant volume of the tank (e.g., allowing for the expansion as the salt is heated), pumps can be mounted directly to the tank wall, instead of using large shaft pumps suspended from the ceiling, reducing pump cost and complexity, and simplifying freeze protection.

In one non-limiting example of a single thermocline storage tank, one or more immersion heaters may be used to heat the hot storage region thermal fluid, and trace heaters may be used to heat the cold storage region thermal fluid.

In another non-limiting examples, there is provided a high heat capacity thermal energy storage system using pumped or flowing MPCs. Heat is added by pumping a cold thermal fluid that includes MPCs through a heat exchanger, solar receiver, or electrical heater cell. The thermal fluid can include a molten salt and/or other fluid such as molten glass. The MPCs in the thermal fluid can be encapsulated MPCs, and/or non-coated MPCs. The MPCs can be used in temperature environments of at least 400° C. The use of higher storage temperatures of the MPCs enable much higher thermal-electrical efficiencies (up to 80% combined heat and power, >50% in direct power cycles), and operate in temperature regimes suitable for decarbonizing industrial processes, including steel, ammonia, hydrogen production, glass, and concrete manufacture. The use of MPCs based on Si in composition with Al, B, Ge, and/or Mg can provide for 100 X-150 X the energy density of lithium-ion batteries, scaling potentially to 50-100 MW-hrs of energy storage in the size of a 40 ft. container. This thermal energy storage that includes the use of MPCs can be generated using grid- or nuclear-generated power (100% conversion to heat), concentrating solar, or renewable and intermittent (PV, wind) sources. Such thermal energy storage can be a) paired with a turbogenerator (supercritical steam or $CO_2$) to generate power, or b) coupled with thermochemical reactors to produce chemicals such as hydrogen and ammonia, and/or energy intense commodities such as steel and concrete.

The MPCs when used with molten glass (e.g., a quaternary molten glass, etc.) can be used to reduce the size and/or cost of thermal energy storage (and transport) systems compared to current solar salt systems. Such glass systems can optionally also contain 1-15% $SiO_2$. In one non-limiting embodiment, the glass can have a viscosity of 80-120 pa-s at 700-800° C., and a glass transition temperature (Tg) of 400-450° C.; however, it will be appreciated that other glasses can be used.

The MPCs can be combined with a glass and/or salt for use in a thermal energy storage (and transport) systems or the like, the content of the MPCs in the thermal fluid is at least 5 vol. %.

In addition to the addition of MPCs and the salt and/or glass in the thermal fluid, the thermal fluid can optionally include colloidal nanoparticles to enhance heat capacity, absorptivity and/or thermal conductivity.

The MPCs include Si-(A and/or B) MPC; Si-(A and/or B)-(X) MPC; and/or Si-(A and/or B)-(X and Y). The elements for A and B are selected from aluminum (Al), copper (Cu), boron (B), germanium (Ge), and magnesium (Mg). When A and B are used in the MPCs, A and B are different elements. The elements for X and Y are selected from Al, Ca, Cr, Co, Cu, Fe, Mg, Mn, and Ni. When X and/or Y are used, X and/or Y are different from A and/or B. When X and Y are used in the MPCs, X and Y are different elements. Non-limiting MPCs include Si—Al, Si—Mg—Cu, Si—Mg, S—Al—Ca, Si—Cu—Ca, Si—Ge, Si—B, Si—Ge—B, Si—Ge—B—X, and/or Si—Ge—B-X-Y.

In one non-limiting formulation, the MPCs have a Si content of at least 10 wt. % (e.g., 10-90 wt. % and all values and ranges therebetween). In another non-limiting aspect of the present disclosure, when the MPCs include Ge, the Ge content in the MPCs is at least 10 wt. % (e.g., 10-60 wt. % and all values and ranges therebetween). In another non-limiting aspect of the present disclosure, when the MPCs include B, the B content in the MPCs is at least 10 wt. % (e.g., 10-60 wt. % and all values and ranges therebetween). In another non-limiting aspect of the present disclosure, when the MPCs include Al, the Al content in the MPCs is at least 10 wt. % (e.g., 10-60 wt. % and all values and ranges therebetween). In another non-limiting aspect of the present disclosure, when the MPCs include Cu, the Cu content in the MPCs is at least 10 wt. % (e.g., 10-60 wt. % and all values and ranges therebetween). In another non-limiting aspect of the present disclosure, when the MPCs include Mg, the Mg content in the MPCs is at least 10 wt. % (e.g., 10-60 wt. % and all values and ranges therebetween). In another non-limiting aspect of the present disclosure, when the MPCs include only X (e.g., Al, Ca, Cr, Co, Cu, Fe, Mg, Mn, Ni), the X content in the MPCs is at least 1 wt. % (e.g., 1-40 wt. % and all values and ranges therebetween). In another non-limiting aspect of the present disclosure, when the MPCs include both X (e.g., Al, Ca, Cr, Co, Cu, Fe, Mg, Mn, Ni) and Y (e.g., Al, Ca, Cr, Co, Cu, Fe, Mg, Mn, Ni), the X content in the MPCs is at least 1 wt. % (e.g., 1-30 wt. % and all values and ranges therebetween) and the Y content in the MPCs is at least 1 wt. % (e.g., 1-30 wt. % and all values and ranges therebetween).

The MPCs can optionally be formed by mixing together metal powders of Si and (A and/or B) and optionally (X and/or Y). During the mixing process, the metal powders can be optionally ground. The metals powders typically are pressed together and optionally sintered. Other forming process prior to sintering (e.g., spraying drying, etc.) can be used to form certain shapes (e.g., spherical, etc.). During the sintering process, the metal powders can optionally be heated above the lowest solidus temperature of the components of the MPCs to cause about 0.5-10% (and all values and ranges therebetween) of the components to liquify during the sintering process.

The MPCs can optionally be partially (e.g., 5-99.9% and all values and ranges therebetween of the outer surface of the MPC is coated) or fully coated particles. Various coating techniques can be used (e.g., vapor deposition [e.g., chemical vapor deposition, physical vapor deposition, etc.]; plasma spraying; coating with a ceramic precursor and then subsequent curing to form a ceramic coating; spray coating; dipping; brushing; rolling; etc.). Non-limiting coatings include SiC, SiOCN, SiCN, $Si_3N_4$, $SiB_6$, $TiO_2$, or an organic polysilizane (PSZ) preceramic polymer. The coating materials can optionally contain a filler (e.g., carbon fibers, boron fibers, ceramic spheres, carbon powders, $TiO_2$, $B_4C$, etc.). The coating thickness of the coating generally is at least 0.1 nm.

In another non-limiting aspect of the present disclosure, the MPCs can have various shapes and sizes. Non-limiting shapes include spheres, flakes, particles, beads, ribbons, etc. The size of the MPCs have at least one dimension that is from 20-5000 microns (and all values and ranges therebetween).

The following properties are desirable, but not are required, for a MPC:
High latent heat of fusion—300+J/g.
A melting point range is generally from 450-1500° C. (and all values and ranges therebetween). For chloride molten salt systems, the melting point range is generally from 500-750° C. For industrial processing applications, the melting point range is generally 600-1000° C. Non-limiting examples of melting point ranges for the molten salt and turbine cycle includes 850-1000° C., 600-720° C., 550-650° C., and 450-550° C.]
Particle density is optionally selected to be between the densities of the hot and cold fluids, matching the cold fluid when solid, and the hot fluid when molten. However, a value independent between the hot and cold fluids is achievable, and is generally from 1.05 to 2.2 g/cc (and all values and ranges therebetween). In one non-limiting example, the particle density is from 1.8- 2.2 g/cc, and typically 1.9 g/cc±0.1. For molten chloride salts, the particle density can be as low as 1.05 g/cc.

The MPCs can optionally be mixed in the molten salt and/or glass and pumped as a slurry through the receiver and heat exchangers. To allow for flow, in addition to density, a fine-sized particle is used which is generally no greater than 500 microns (e.g., 10-500 microns and all values and ranges therebetween), typically 25 microns (325 mesh) to 200 microns (100 mesh), and more typically 50-125 microns. Too small of a particle can lead to higher viscosity, and excess loss to the inert encapsulation material. Too large of a particle has excessive tendencies to settle or float, and cannot melt or solidify quickly enough in the heat exchangers, leading to excessively large heat exchangers. The particle size is typically selected for a heat exchanger or receiver such that the exposure time of the particle based on a melting time under heat exchanger thermal flux is from 5-200 seconds residence time (and all values and ranges therebetween), and typically 10 and 60 seconds residence time. For some heat exchangers, residence times can be minutes or longer, The particle thermal conductivity is typically high to meet melting time requirements. Thermal conductivity of the MPCs is generally greater than 50 W/m-K (e.g., 50-350 W/m-K and all values and ranges therebetween), typically greater than 100 W/m-K, more typically greater than 150 W/m-K, and even more typically greater than 200 W/m-K.

The optional encapsulation or coating material for the MPCs (when used) is generally selected to be compatible with the molten salt and/or glass, have good thermal conductivity, have a fairly low density, and/or form a thin coating on the MPC alloy. The desirable coating material should be easily applied, such as by plating, spray-coating, CVD, or solution deposition. Suitable techniques include sol-gel synthesis (oxides), plating (molten salt or electroless (metals), CVD, or via polymer chemistry. In one non-limiting embodiment, the coating or encapsulation includes polysilazane preceramic polymer, where the polysilazane can optionally include reactive fillers to offset shrinkage, fillers such as, but not limited to, boron nitride, boron carbide, boron nitride nanosheets, titanium oxide, metal particles, alumina, and/or other oxide particles to modify the thermal properties of the coating and the residual stress after pyrolysis and thermal cycling. The filler content in the coating material is generally 0-60 wt. % (and all values and ranges therebetween), and typically 0-40 wt. %. When the coating material includes filler, the filler content is generally at least 0.5 wt. %. The thickness of the coating layer can be 1-25% (and all values and ranges therebetween) of the metal alloy diameter of the MPC. For higher temperature MPC's with melting points above 850° C., CVD coating, such as in a fluidized or rotary bed, using the decomposition of chlorosilanes such as MTS (mthyltricholorsilane) or DDS (dimethyldichlorosilane). The use of preceramic polymers, such as polysilizanes and polycarbosilizanes is preferred when the MPC melting point is below 850° C.

EXAMPLES

Example 1: Coated MPCs are prepared by melt atomizing a mixture of 79 wt. % aluminum and 21 wt. % silicon metal into spherical powders to form core particles. The core particles were then sieved to −150 to +325 mesh (45-100 microns). The core SiAl particles were then coated with a thermosetting phenolic resin, and then further coated with a preceramic polymer coating formulation that includes polysilizane with 5 wt. % boron carbide and 5 wt. % fumed silica. The coated MPCs were initially cured at a temperature of 240° C. for about hour, and then slowly heating at 1 C°/min to a temperature of 350° C.-800° C. Thereafter, the coated MPCs were cooled. 30 vol. % MPC's are then added to a eutectic mixture of CaCl$_2$, MgCl$_2$, NaCl, and KCl to form a thermal fluid. The thermal fluid had the effective heat capacities and properties as shown in Table 1:

ness of 7-10 microns. The MPCs had a latent heat above 1500 J/g and the core of the MPCs has a melting range of 945° C.-1210° C.

Although example embodiments have been disclosed, a worker of ordinary skill in this art would recognize that certain modifications would come within the scope of the claims. For that reason, the following claims should be studied to determine their true scope and content.

It will thus be seen that the objects set forth above, among those made apparent from the preceding description, are efficiently attained, and since certain changes may be made in the constructions set forth without departing from the spirit and scope of the disclosure, it is intended that all

TABLE 1

| temperature | wt % salt | wt % PCM | Al Cp J/g-K | Si Cp J/g-K | PCM density g/cc | salt density g/cc | fluid density g/cc | Cp salt J/g-K | average delta H J/g-K | Cp PCM J/g-K | effective Cp J/g-K |
| --- | --- | --- | --- | --- | --- | --- | --- | --- | --- | --- | --- |
| RT  |    |    | 0.9   | 0.71 | 2.35 |      |             |      |             |        |             |
| 500 | 63 | 37 | 1.15  | 0.88 | 2.29 | 1.67 | 1.855915753 | 1.05 | 0           | 1.096  | 1.06702     |
| 520 | 63 | 37 | 1.17  | 0.88 | 2.28 | 1.66 | 1.845703696 | 1.05 | 0           | 1.112  | 1.07294     |
| 540 | 63 | 37 | 1.195 | 0.88 | 2.27 | 1.65 | 1.835489562 | 1.04 | 0           | 1.132  | 1.07404     |
| 560 | 63 | 37 | 1.219 | 0.89 | 2.26 | 1.64 | 1.825273318 | 1.04 | 0           | 1.1532 | 1.081884    |
| 580 | 63 | 37 | 1.243 | 0.89 | 2.25 | 1.63 | 1.815054934 | 1.03 | 28.8015     | 1.1724 | 11.739243   |
| 600 | 63 | 37 | 1.27  | 0.89 | 2.24 | 1.62 | 1.804834378 | 1.03 | 1.082142857 | 1.194  | 1.491072857 |
| 620 | 63 | 37 | 1.29  | 0.9  | 2.23 | 1.61 | 1.794611617 | 1.02 | 1.0824      | 1.212  | 1.491528    |
| 640 | 63 | 37 | 1.32  | 0.9  | 2.22 | 1.6  | 1.784386617 | 1.02 | 1.082142857 | 1.236  | 1.500312857 |
| 660 | 63 | 37 | 1.35  | 0.9  | 2    | 1.59 | 1.720499919 | 1.01 | 1.082142857 | 1.26   | 1.502892857 |
| 680 | 63 | 37 | 1.37  | 0.91 | 1.99 | 1.58 | 1.710384594 | 1.01 | 1.082142857 | 1.278  | 1.509552857 |
| 700 | 63 | 37 | 1.4   | 0.91 | 1.98 | 1.57 | 1.700268009 | 1    | 1.082142857 | 1.302  | 1.512132857 |
| 720 | 63 | 37 | 1.42  | 0.91 | 1.97 | 1.55 | 1.682739998 | 1    | 1.082142857 | 1.318  | 1.518052857 |
| total joules per gram |  |  |  |  |  |  |  |  |  |  |  |
| total joules/cc |  |  |  |  |  |  |  |  |  |  |  | all numbers in J/g-K

Example 2: Coated MPCs are prepared by melt atomizing a mixture of 57 wt. % Si and 43 wt. % Mg by gas atomization to form core particles, and then the core particles where screened to −150 to +325 mesh (45-100 micron). The core particles wherein then coated with SiC using the decomposition of DDS (dimethyledichlorosilane) at 875° C. in a fluidized bed to a thickness of 7-10 microns. The properties of the MPCs are shown in Table 2.

matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and

TABLE 2

| temperature | wt % PCM | Mg Cp J/g-K | Si Cp J/g-K | PCM density g/cc | ave delta H J/g-K | Cp PCM J/g-K | effective Cp J/g-K | total energy J/g |
| --- | --- | --- | --- | --- | --- | --- | --- | --- |
| RT   |   |     | 1.02  | 0.71 | 2.15 |            |        |             |             |
| 900  | 0 | 100 | 1.15  | 0.91 | 1.9  | 0          | 0.982  | 0.982       | 19.64       |
| 920  | 0 | 100 | 1.17  | 0.93 | 1.9  | 0          | 1.002  | 1.002       | 20.04       |
| 940  | 0 | 100 | 1.195 | 0.93 | 1.9  | 59.43      | 1.0095 | 60.4395     | 1208.79     |
| 960  | 0 | 100 | 1.219 | 0.94 | 1.91 | 1.37071429 | 1.0237 | 2.394414286 | 47.88828571 |
| 980  | 0 | 100 | 1.243 | 0.94 | 1.92 | 1.37071429 | 1.0309 | 2.401614286 | 48.03228571 |
| 1000 | 0 | 100 | 1.27  | 0.95 | 1.93 | 1.37071429 | 1.046  | 2.416714286 | 48.33428571 |
| 1020 | 0 | 100 | 1.29  | 0.95 | 1.94 | 1.37071429 | 1.052  | 2.422714286 | 48.45428571 |
| 1040 | 0 | 100 | 1.29  | 0.96 | 1.95 | 1.37071429 | 1.059  | 2.429714286 | 48.59428571 |
| 1060 | 0 | 100 | 1.3   | 0.97 | 1.98 | 1.37071429 | 1.069  | 2.439714286 | 48.79428571 |
| 1080 | 0 | 100 | 1.3   | 0.98 | 2.2  | 1.37071429 | 1.076  | 2.446714286 | 48.93428571 |
| 1100 | 0 | 100 | 1.31  | 0.98 | 2.21 | 1.37071429 | 1.079  | 2.449714286 | 48.99428571 |
| 1120 | 0 | 100 | 1.32  | 0.99 | 2.21 | 1.37071429 | 1.089  | 2.459714286 | 49.19428571 |
| total joules per gram |  |  |  |  |  |  |  |  | 1666.050571 |
| total joules/cc |  |  |  |  |  |  |  |  | 1832.655629 |

55% packing density

Example 3: Coated MPCs are prepared as in Example 2, but by melting and atomizing a mixture of 18 wt. % Si and 82 wt. % Ge to form core particles, and then the core particles wherein screened to −150 to +325 mesh. The core particles were then coated with SiC using CVD to a thickalterations insofar as they come within the scope of the present disclosure. It is also to be understood that the following claims are intended to cover all of the generic and specific features of the disclosure herein described and all statements of the scope of the disclosure which, as a matter of language, might be said to fall therebetween. The disclosure has been described with reference to the preferred embodiments. These and other modifications of the preferred embodiments, as well as other embodiments of the disclosure, will be obvious from the disclosure herein, whereby the foregoing descriptive matter is to be interpreted merely as illustrative of the disclosure and not as a limitation. It is intended to include all such modifications and alterations insofar as they come within the scope of the appended claims.

What is claimed:

1. A thermal energy storage system which includes:
   a. a storage tank;
   b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; wherein the MPC includes a core and coating; said core is formulated to have a liquidus temperature of 550-750° C.; said MPC is formulated to be reusable to a temperature of at least 700° C.

2. The thermal energy storage system as defined in claim 1, wherein the MPC has a particle size of 20-2000 microns.

3. The thermal energy storage system as defined in claim 1, wherein said MPC includes a core and coating; said MPC formulated to be reusable to a temperature of 800-1200° C.

4. The thermal energy storage system as defined in claim 1, wherein said thermal fluid includes a eutectic salt or near eutectic salt, or a eutectic glass or near eutectic glass.

5. The thermal energy storage system as defined in claim 1, wherein the salt includes one or more of a) sodium nitrate/potassium nitrate, b) a ternary salt mixture of $NaNO_3/KNO_3/NaNO_2$, c) carbonate and fluoride salts, d) LiNaK fluorides, e) ZnNaK chlorides, f) MgNaK chlorides, g) $AlCl_3$—NaCl—KCl, h) $ZnCl_2$—NaCl—KCl, i) $FeCl_3$—NaCl—KCl, j) NaCl—$CaCl_2$—$MgCl_2$, and/or k) KCl—NaCl—$CaCl_2$—$MgCl_2$; the glass is a phosphate or borate low melting point glass.

6. The thermal energy storage system as defined in claim 1, wherein said thermal mixture includes 5-80 vol. % MPC and 20-95 vol. % salt and/or glass.

7. The thermal energy storage system as defined in claim 1, wherein said MPC has a size having at least one dimension that is from 20-5000 microns.

8. A thermal energy storage system which includes:
   a. a storage tank;
   b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC is formulated to be reusable in a temperature environment of at least 400° C.; said thermal mixture further includes 0.5-10 vol. % colloidal nanoparticles.

9. The thermal energy storage system as defined in claim 8, wherein said colloidal nanoparticles include one or more metals, metal oxides, and/or non-metal oxides; said colloidal nanoparticles have at least one dimension that is no more than 200 nm.

10. The thermal energy storage system as defined in claim 8, wherein said colloidal nanoparticles include one or more materials selected from the group consisting of $SiO_2$, ZnO, $Al_2O_3$, $TiO_2$, MgO, $Fe_2O_3$, $BaTiO_3$, $Ce_2O_3$, $ZrO_2$, CaO, Ni, Mo, Si, Re, Nb, Ta, W, Au, and Ag.

11. A thermal energy storage system which includes:
   a. a storage tank;
   b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC includes a core and coating; said core is formulated to have a liquidus temperature above 400° C.; said MPC is formulated to be reusable in a temperature environment of at least 800° C.; said MPC includes at least 50 wt. % Si metal.

12. A thermal energy storage system which includes:
   a. a storage tank;
   b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC is formulated to be reusable in a temperature environment of at least 400° C.; said MPC has a latent heat of at least 300 J/g.

13. A thermal energy storage system which includes:
   a. a storage tank;
   b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC is formulated to be reusable in a temperature environment of at least 400° C.; said MPC has a latent heat that falls within the range of 300-2000 J/g.

14. A thermal energy storage system which includes:
   a. a storage tank;
   b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC is formulated to be reusable in a temperature environment of at least 400° C.; said MPC includes a) Si-(A and/or B) MPC; b) Si-(A and/or B)-(X) MPC; and/or c) Si-(A and/or B)-(X and Y); said A, B, X and Y are elements; said elements for A and B are selected from the group consisting of aluminum, copper, boron, germanium, and magnesium; said elements for X and Y are selected from the group consisting of aluminum, calcium, chromium, cobalt, copper, iron, magnesium, manganese, and nickel.

15. A thermal energy storage system which includes:
   a. a storage tank;
   b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC is formulated to be reusable in a temperature environment of at least 400° C.; said MPC includes one or more materials selected from the group consisting of Si—Al, Si—Mg—Cu, Si—Mg, Si—Al—Ca, Si—Cu—Ca, Si—Ge, Si—B, Si—Ge—B, Si—Ge—Fe, Si—Ge—Mn, Si—Ge—Fe—Mn, Si—Ge—Cu, Si—Ge—Ni, Si—Ge—Cr, Si—Ge—Cu—Fe, Si—Ge—Ni—Fe, and Si—Ge—Cr—Fe.

16. A thermal energy storage system which includes:
a. a storage tank;
b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC is formulated to be reusable in a temperature environment of at least 400° C.; said MPC includes at least 10 wt. % Si; and one or more of a) at least 10 wt. % Al, b) at least 10 wt. % B; c) at least 10 wt. % Cu, d) at least 10 wt. % Ge, and e) at least 10 wt. % Mg.

17. A thermal energy storage system which includes:
a. a storage tank;
b. a thermal fluid; said thermal fluid includes i) glass and/or salt; and ii) a metallic phase change material (MPC); said MPC is mixed with said thermal fluid to form a thermal mixture; said MPC includes an encapsulated metallic mixture having a melting temperature or range that falls within a temperature range of 400-1500° C.; said MPC is formulated to be reusable in a temperature environment of at least 400° C.; said MPC includes an outer coating; said outer coating includes one or more materials selected from the group consisting of SiC, SiOCN, SiCN, $Si_3N_4$, $SiB_6$, $TiO_2$, and an organic polysilizane preceramic polymer.

18. The thermal energy storage system as defined in claim 17, wherein said coating includes filler; said filler including one or more materials selected from the group consisting of carbon fibers, boron fibers, ceramic spheres, carbon powders, $TiO_2$, SiC powder, Boron nitride, and $B_4C$.

19. The thermal energy storage system as defined in claim 17, wherein said coating has a thickness of 1 to 500 microns.

20. A thermal energy storage system which includes:
a. a storage tank; and,
b. a thermal fluid; said thermal fluid includes i) glass and/or salt; and ii) a metallic phase change material (MPC); said MPC is mixed with said thermal fluid to form a thermal mixture; said thermal mixture includes 5-80 vol. % MPC and 20-95 vol. % salt and/or glass; said thermal fluid includes a ternary salt, a quaternary salt, and/or a quinary salt; said MPC includes a) Si-(A and/or B) MPC; b) Si-(A and/or B)-(X) MPC; and/or c) Si-(A and/or B)-(X and Y); said A, B, X and Y are elements; said elements for A and B are selected from the group consisting of aluminum, copper, boron, germanium, and magnesium; said elements for X and Y are selected from the group consisting of aluminum, calcium, chromium, cobalt, copper, iron, magnesium, manganese, and nickel; said MPC includes an encapsulated metallic mixture having a melting temperature of 400-1500° C.; said MPC is formulated to be reusable in a temperature environment of at least 400° C.; said MPC has a particle size of 20-5000 microns; said MPC has a latent heat of at least 300 J/g.

21. The thermal energy storage system as defined in claim 20, wherein said MPC includes a core and a coating; said core is formulated to have a liquidus temperature of greater than 400° C.

22. The thermal energy storage system as defined in claim 21, wherein said coating; said outer coating includes one or more materials selected from the group consisting of SiC, SiOCN, SiCN, $Si_3N_4$, $SiB_6$, $TiO_2$, and an organic polysilizane preceramic polymer; said coating has a thickness of 1 to 500 microns.

23. The thermal energy storage system as defined in claim 21, wherein said coating includes filler; said filler includes one or more materials selected from the group consisting of carbon fibers, boron fibers, ceramic spheres, carbon powders, $TiO_2$, SiC powder, boron nitride, and $B_4C$.

24. The thermal energy storage system as defined in claim 20, wherein said thermal fluid includes a eutectic salt or near eutectic salt, or a eutectic glass or near eutectic glass; said eutectic salt or near eutectic salt includes one or more of a) sodium nitrate/potassium nitrate, b) a ternary salt mixture of $NaNO_3/KNO_3/NaNO_2$, c) carbonate and fluoride salts, d) LiNaK fluorides, e) ZnNaK chlorides, f) MgNaK chlorides, g) $AlCl_3$—NaCl—KCl, h) $ZnCl_2$—NaCl—KCl, i) $FeCl_3$—NaCl—KCl, j) NaCl—$CaCl_2$—$MgCl_2$, and/or k) KCl—NaCl—$CaCl_2$—$MgCl_2$; said eutectic glass or near eutectic glass is a phosphate or borate low melting point glass.

25. The thermal energy storage system as defined in claim 21, wherein said thermal fluid includes a eutectic salt or near eutectic salt, or a eutectic glass or near eutectic glass; said eutectic salt or near eutectic salt includes one or more of a) sodium nitrate/potassium nitrate, b) a ternary salt mixture of $NaNO_3/KNO_3/NaNO_2$, c) carbonate and fluoride salts, d) LiNaK fluorides, e) ZnNaK chlorides, f) MgNaK chlorides, g) $AlCl_3$—NaCl—KCl, h) $ZnCl_2$—NaCl—KCl, i) $FeCl_3$—NaCl—KCl, j) NaCl—$CaCl_2$—$MgCl_2$, and/or k) KCl—NaCl-$CaCl_2$—$MgCl_2$; said eutectic glass or near eutectic glass is a phosphate or borate low melting point glass.

26. The thermal energy storage system as defined in claim 20, wherein said thermal mixture further includes 0.5-10 vol. % colloidal nanoparticles; said colloidal nanoparticles include one or more metals, metal oxides, and/or non-metal oxides; said colloidal nanoparticles have at least one dimension that is no more than 200 nm.

27. The thermal energy storage system as defined in claim 25, wherein said thermal mixture further includes 0.5-10 vol. % colloidal nanoparticles; said colloidal nanoparticles include one or more metals, metal oxides, and/or non-metal oxides; said colloidal nanoparticles have at least one dimension that is no more than 200 nm.

28. The thermal energy storage system as defined in claim 26, wherein said colloidal nanoparticles include one or more materials selected from the group consisting of $SiO_2$, ZnO, $Al_2O_3$, $TiO_2$, MgO, $Fe_2O_3$, $BaTiO_3$, $Ce_2O_3$, $ZrO_2$, CaO, Ni, Mo, Si, Re, Nb, Ta, W, Au, and Ag.

29. The thermal energy storage system as defined in claim 20, wherein said MPC includes one or more materials selected from the group consisting of Si—Al, Si—Mg—Cu, Si—Mg, Si—Al—Ca, Si—Cu—Ca, Si—Ge, Si—B, Si—Ge—B, Si—Ge—Fe, Si—Ge—Mn, Si—Ge—Fe—Mn, Si—Ge—Cu, Si—Ge—Ni, Si—Ge—Cr, Si—Ge—Cu—Fe, Si—Ge—Ni—Fe, and Si—Ge—Cr—Fe.

30. The thermal energy storage system as defined in claim 27, wherein said MPC includes one or more materials selected from the group consisting of Si—Al, Si—Mg—Cu, Si—Mg, Si—Al—Ca, Si—Cu—Ca, Si—Ge, Si—B, Si—Ge—B, Si—Ge—Fe, Si—Ge—Mn, Si—Ge—Fe—Mn, Si—Ge—Cu, Si—Ge—Ni, Si—Ge—Cr, Si—Ge—Cu—Fe, Si—Ge—Ni—Fe, and Si—Ge—Cr—Fe.

31. The thermal energy storage system as defined in claim 29, wherein said MPC includes at least 50 wt. % Si metal.

32. The thermal energy storage system as defined in claim 20, wherein said MPC includes at least 10 wt. % Si; and one or more of a) at least 10 wt. % Al, b) at least 10 wt. % B; c) at least 10 wt. % Cu, d) at least 10 wt. % Ge, and e) at least 10 wt. % Mg.

33. The thermal energy storage system as defined in claim 30, wherein said MPC includes at least 10 wt. % Si; and one or more of a) at least 10 wt. % Al, b) at least 10 wt. % B; c) at least 10 wt. % Cu, d) at least 10 wt. % Ge, and e) at least 10 wt. % Mg.

34. The thermal energy storage system as defined in claim 20, wherein said MPC includes at least 20 wt. % Si and one or more alloying elements selected from the group consisting of Al, Mg, Ge, Fe, Ni, Cu, Mn, and Cr.

35. The thermal energy storage system as defined in claim 30, wherein said MPC includes at least 20 wt. % Si and one or more alloying elements selected from the group consisting of Al, Mg, Ge, Fe, Ni, Cu, Mn, and Cr.

36. The thermal energy storage system as defined in claim 34, wherein said MPC includes 20-80 wt. % Si, and 20-80 wt. % of one or more of Al, Mg, Ge, Fe, Ni, Cu, Mn, and Cr.

37. The thermal energy storage system as defined in claim 36, wherein said MPC two or more of Al, Mg, Ge, Fe, Ni, Cu, Mn, and Cr.

38. The thermal energy storage system as defined in claim 34, wherein said MPC includes 1-25 wt. % of B.

* * * * *